(12) United States Patent
Cai et al.

(10) Patent No.: US 8,077,709 B2
(45) Date of Patent: Dec. 13, 2011

(54) REDUNDANCY AT A VIRTUAL PROVIDER EDGE NODE THAT FACES A TUNNELING PROTOCOL CORE NETWORK FOR VIRTUAL PRIVATE LOCAL AREA NETWORK (LAN) SERVICE (VPLS)

(75) Inventors: Dezhong Cai, San Jose, CA (US); Ali Sajassi, San Ramon, CA (US); Roberto Kobo, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 979 days.

(21) Appl. No.: 11/857,711

(22) Filed: Sep. 19, 2007

(65) Prior Publication Data
US 2009/0073989 A1 Mar. 19, 2009

(51) Int. Cl.
*H04L 12/28* (2006.01)
*H04L 12/56* (2006.01)
*H04L 12/66* (2006.01)

(52) U.S. Cl. ..... 370/389; 370/252; 370/352; 370/395.5; 370/395.53; 370/401; 370/409

(58) Field of Classification Search ............. 370/395.53, 370/401, 409, 395.5, 252, 352
See application file for complete search history.

(56) References Cited

U.S. PATENT DOCUMENTS

| | | |
|---|---|---|
| 4,706,080 A | 11/1987 | Sincoskie |
| 4,811,337 A | 3/1989 | Hart |
| 5,394,402 A | 2/1995 | Ross |
| 5,742,604 A | 4/1998 | Edsall et al. |
| 5,761,435 A | 6/1998 | Fukuda et al. |
| 5,818,842 A | 10/1998 | Burwell et al. |
| 5,848,227 A | 12/1998 | Sheu |
| 5,878,232 A | 3/1999 | Marimuthu |
| 6,055,364 A | 4/2000 | Speakman et al. |
| 6,073,176 A | 6/2000 | Baindur et al. |
| 6,078,590 A | 6/2000 | Farinacci et al. |

(Continued)

FOREIGN PATENT DOCUMENTS

CN 1604545 4/2005

(Continued)

OTHER PUBLICATIONS

Cisco Systems, Inc., Cisco IOS MPLS Virtual Private LAN Service, www.cisco.com/warp/public/cc/techno/, Jan. 1, 2004, p. 6pp, vol. mplsty/prodlit/, Number virp2_tb.pdf, Publisher: Cisco Systems, Inc., Published in: San Jose, California, US.

(Continued)

*Primary Examiner* — Hassan Phillips
*Assistant Examiner* — Lonnie Sweet
(74) *Attorney, Agent, or Firm* — Patent Capital Group

(57) ABSTRACT

In one embodiment, a method includes receiving configuration data at a particular node of a first set of multiple nodes. The configuration data includes data that indicates a particular zero or more instances for which the particular node is primary among multiple virtual local area network (VLAN) instances to be forwarded. It is determined whether a VLAN indicated in a data packet received at the particular node is included in the particular instances for which the particular node is primary. If so, then the data packet is forwarded. In another embodiment, multiple nodes are configured to perform as a single virtual node, and the single virtual node is configured to forward data packets for the multiple VLAN.

24 Claims, 10 Drawing Sheets

U.S. PATENT DOCUMENTS

| | | |
|---|---|---|
| 6,188,694 B1 | 2/2001 | Fine et al. |
| 6,301,244 B1 | 10/2001 | Huang et al. |
| 6,308,282 B1 | 10/2001 | Huang |
| 6,373,838 B1 | 4/2002 | Law et al. |
| 6,424,657 B1 | 7/2002 | Voit et al. |
| 6,430,621 B1 | 8/2002 | Srikanth et al. |
| 6,484,209 B1 | 11/2002 | Momirov |
| 6,502,140 B1 | 12/2002 | Boivie |
| 6,611,869 B1 | 8/2003 | Eschelbeck et al. |
| 6,667,982 B2 | 12/2003 | Christie et al. |
| 6,668,282 B1 | 12/2003 | Booth, III et al. |
| 6,732,189 B1 | 5/2004 | Novaes |
| 6,757,286 B1 | 6/2004 | Stone |
| 6,763,469 B1 | 7/2004 | Daniely |
| 6,785,232 B1 | 8/2004 | Kotser et al. |
| 6,785,265 B2 | 8/2004 | White et al. |
| 6,789,121 B2 | 9/2004 | Lamberton et al. |
| 6,798,775 B1 | 9/2004 | Bordonaro |
| 6,801,533 B1 | 10/2004 | Barkley |
| 6,813,268 B1 | 11/2004 | Kalkunte et al. |
| 6,826,698 B1 | 11/2004 | Minkin et al. |
| 6,829,252 B1 | 12/2004 | Lewin et al. |
| 6,839,348 B2 | 1/2005 | Tang et al. |
| 6,850,521 B1 | 2/2005 | Kadambi et al. |
| 6,850,542 B2 | 2/2005 | Tzeng |
| 6,852,542 B2 | 2/2005 | Mandel et al. |
| 6,882,643 B1 | 4/2005 | Mauger et al. |
| 6,892,309 B2 | 5/2005 | Richmond et al. |
| 6,954,436 B1 | 10/2005 | Yip |
| 7,009,983 B2 | 3/2006 | Mancour |
| 7,092,389 B2 | 8/2006 | Chase et al. |
| 7,113,512 B1 | 9/2006 | Holmgren et al. |
| 7,116,665 B2 | 10/2006 | Balay et al. |
| 7,173,934 B2 | 2/2007 | Lapuh et al. |
| 7,277,936 B2 | 10/2007 | Frietsch |
| 7,310,342 B2 | 12/2007 | Rouleau |
| 7,343,423 B2 | 3/2008 | Goguen et al. |
| 7,345,991 B1 | 3/2008 | Shabtay et al. |
| 7,408,936 B2 | 8/2008 | Ge et al. |
| 7,466,703 B1 | 12/2008 | Arunachalam et al. |
| 2002/0032780 A1 | 3/2002 | Moore et al. |
| 2002/0087721 A1 | 7/2002 | Sato et al. |
| 2002/0196795 A1 | 12/2002 | Higashiyama |
| 2003/0012183 A1 | 1/2003 | Butler et al. |
| 2003/0026271 A1 | 2/2003 | Erb et al. |
| 2003/0036375 A1 | 2/2003 | Chen et al. |
| 2003/0101243 A1 | 5/2003 | Donahue et al. |
| 2003/0110268 A1 | 6/2003 | Kermarec et al. |
| 2003/0112781 A1 | 6/2003 | Kermode et al. |
| 2003/0142674 A1 | 7/2003 | Casey |
| 2003/0154259 A1 | 8/2003 | Lamberton et al. |
| 2003/0174706 A1 | 9/2003 | Shankar et al. |
| 2003/0177221 A1 | 9/2003 | Ould-Brahim et al. |
| 2004/0095940 A1 | 5/2004 | Yuan et al. |
| 2004/0102182 A1 | 5/2004 | Reith et al. |
| 2004/0125809 A1 | 7/2004 | Jeng |
| 2004/0141501 A1 | 7/2004 | Adams et al. |
| 2004/0151180 A1 | 8/2004 | Hu et al. |
| 2004/0158735 A1 | 8/2004 | Roese |
| 2004/0165525 A1 | 8/2004 | Burak |
| 2004/0165600 A1 | 8/2004 | Lee |
| 2004/0172559 A1 | 9/2004 | Luo et al. |
| 2004/0228291 A1 | 11/2004 | Huslak et al. |
| 2004/0233891 A1 | 11/2004 | Regan et al. |
| 2004/0252717 A1 | 12/2004 | Solomon et al. |
| 2004/0264364 A1* | 12/2004 | Sato .............................. 370/217 |
| 2005/0007951 A1 | 1/2005 | Lapuh et al. |
| 2005/0018605 A1 | 1/2005 | Foote et al. |
| 2005/0025143 A1 | 2/2005 | Chen et al. |
| 2005/0030975 A1 | 2/2005 | Wright et al. |
| 2005/0044262 A1 | 2/2005 | Luo |
| 2005/0044265 A1 | 2/2005 | Vinel et al. |
| 2005/0063397 A1 | 3/2005 | Wu et al. |
| 2005/0097219 A1 | 5/2005 | Goguen et al. |
| 2005/0099949 A1 | 5/2005 | Mohan et al. |
| 2005/0152370 A1 | 7/2005 | Meehan et al. |
| 2005/0157664 A1 | 7/2005 | Baum |
| 2005/0157721 A1 | 7/2005 | Rabie et al. |
| 2005/0157751 A1 | 7/2005 | Rabie et al. |
| 2005/0163049 A1 | 7/2005 | Yazaki et al. |
| 2005/0175022 A1 | 8/2005 | Nishimura et al. |
| 2005/0190773 A1 | 9/2005 | Yang et al. |
| 2005/0220014 A1 | 10/2005 | DelRegno et al. |
| 2005/0249124 A1 | 11/2005 | Elie-Dit-Cosaque et al. |
| 2005/0259597 A1* | 11/2005 | Benedetto et al. ............ 370/254 |
| 2005/0286503 A1 | 12/2005 | Oda et al. |
| 2006/0047851 A1* | 3/2006 | Voit et al. ...................... 709/239 |
| 2006/0092847 A1 | 5/2006 | Mohan et al. |
| 2006/0098607 A1 | 5/2006 | Zeng |
| 2006/0182037 A1 | 8/2006 | Chen et al. |
| 2006/0248277 A1 | 11/2006 | Pande |
| 2006/0285500 A1 | 12/2006 | Booth |
| 2006/0285501 A1 | 12/2006 | Damm |
| 2007/0008982 A1 | 1/2007 | Voit et al. |
| 2007/0058638 A1* | 3/2007 | Guichard et al. ........ 370/395.31 |

FOREIGN PATENT DOCUMENTS

| | | |
|---|---|---|
| EP | 1388979 | 2/2004 |
| WO | WO 2007/031002 | 3/2007 |
| WO | WO 2008/089370 | 7/2008 |

OTHER PUBLICATIONS

T. Li et al., Cisco Hot Standby Router Protocol (HSRP), www.ietf.org/rfc, Mar. 1, 1998, p. 17pp, Volume RFC, No. RFC2281, Publisher: Internet Engineering Task Force, Published in: Internet.

R. Hinden, Ed., Virtual Router Redundancy Protocol (VRRP), www.ietf.org/rfc, Apr. 1, 2004, p. 27pp, Volume RFC, No. RFC3768, Publisher: Internet Engineering Task Force, Published in: Internet.

Lasserre, M., et al., Virtual Private LAN Service (VPLS) Using Label Distribution Protocol (LDP) Signaling, www.ietf.org/rfc, Jan. 1, 2007, p. 31pp, Volume RFC, No. RFC4762, Publisher: Internet Engineering Task force, Published in: Internet.

U.S. Appl. No. 13/069,249, entitled "Prevention of Looping and Duplicate Frame Delivery in a Network Environment," filed Mar. 22, 2011, Inventors: Ali Sajassi, et al.

U.S. Appl. No. 13/087,259, entitled "Prevention of Looping and Duplicate Frame Delivery in a Network Environment," filed Apr. 14, 2011, Inventors: Ali Sajassi, et al.

Blunk et al., "Extensible Authentication Protocol EAP," Draft RFC 2284; Feb. 2004, http://tools.ietf.org/html/draft-ietf-eap-rfc2284bis-09.

Delord, Simon, et al., "PWE3 Applications & OAM Scenarios," Pseudo-Wire Edge-to-Edge (PWE3) Working Group; Internet Draft, Internet Engineering Task Force, IETF, CH, No. 2; Oct. 1, 2005, XP015042128 ISSN: 0000-0004 abstract p. 10, paragraph 3 Section 3.1.1.1 on pp. 12-13; http://ftp.ist.utl.pt/pub/drafts/draft-delord-pwe3-oam-applications-02.txt.

EPO Feb. 26, 2003 European Search Report for EP Application No. 02291952; 1 page.

Fine, M. et al., "Shared Spanning Trees," Cisco Systems, Jan. 15, 1999, 30 pages http://www.ieee802.org/1/files/public/docs1999/sstp-ieee.pdf.

Finn, Norman, "Shared Spanning Trees IEEE 802.1s Multiple Spanning Trees for .1q," Cisco Systems, Jan. 27, 1999, 11 pages http://www.ieee802.org/1/files/public/docs1999/sstp-ieee-slides.pdf.

Hart; J., "Extending the IEEE 802.1 MAC Bridge Standard to Remote Bridges," IEEE Network, Jan. 1998, vol. 2, No. 1, [Abstract Only].

ISO/IEC 15802-3: 1998 ANSI/IEEE Std 802.1d, 1998, IEEE, pp. 58-109 http://speed.cis.nctu.edu.tw/~ydlin/course/cn/exp/Exp_NBL/stp/802.1D-1998.pdf.

Lahti, "Quality of Service in the Point-to-Point Protocol over Ethernet," Oct. 1, 2000, 75 pages http://www.e.kth.se/~e95_pla/exjobb/doc/Lahti_Thesis_QoS_in_PPPOE.pdf.

Lasserre, Marc et al., "Virtual Private LAN Services over MPLS," Internet Draft Documents, Mar. 2003, 27 pages http://tools.ietf.org/pdf/draft-lasserre-vkompelia-ppvpn-vpls-04.pdf.

Martini, Luca, "Encapsulation Methods for Transport of Ethernet Frames Over IP and MPLS Networks," Network Working Group, Internet Draft, Jul. 2002, XP002231555; 20 pages; http://tools.ietf.org/pdf/draft-martini-ethernet-encap-mpls-01.pdf.

PCT Jul. 21, 2009 International Preliminary Report on Patentability (1 page) and Written Opinion of the International Searching Authority (5 pages) from PCT/US2008/051372.

PCT Mar. 18, 2008 International Preliminary Report on Patentability (1 page) and Written Opinion of the International Searching Authority (3 pages) for PCT/CN2006/002231 (Translation).

PCT Dec. 26, 2006 International Search Report from PCT/CN2006/002231 (Translation); 4 pages.

PCT Jun. 25, 2008 International Search Report from PCT/US2008/051372; 2 pages.

Perlman, R., "Interconnections: Bridges and Routers," Copyright 1992 by Addison Wesley Publishing Company, Inc., pp. 54-64 [Description Only].

Riverstone Networks, "How Ehtemet,RPR and MPLS Work Together," White Paper from Riverstone Networks, Sep. 2001, pp. 1-19 XP002231554; http://www.riverstonenet.com/pdf/unified_future.pdf.

Sajassi, Ali, et al., "Routed VPLS Using BGP," Internet Working Group, Internet Draft, Mar. 23, 2010, 18 pages; http://tools.ietf.org/html/draft-sajassi-l2vpn-rvpls-bgp-00.

Seaman, M., "High Availability Spanning Tree," Rev. 1.1, Oct. 26, 1998 http://www.ieee802.org/1/files/public/docs1998/hasten7.pdf.

Yener, et al., "Fault-Tolerant convergence Routing," Copyright 1994, IEEE http://www.ieee-icnp.org/1994/papers/1994-27.pdf.

* cited by examiner

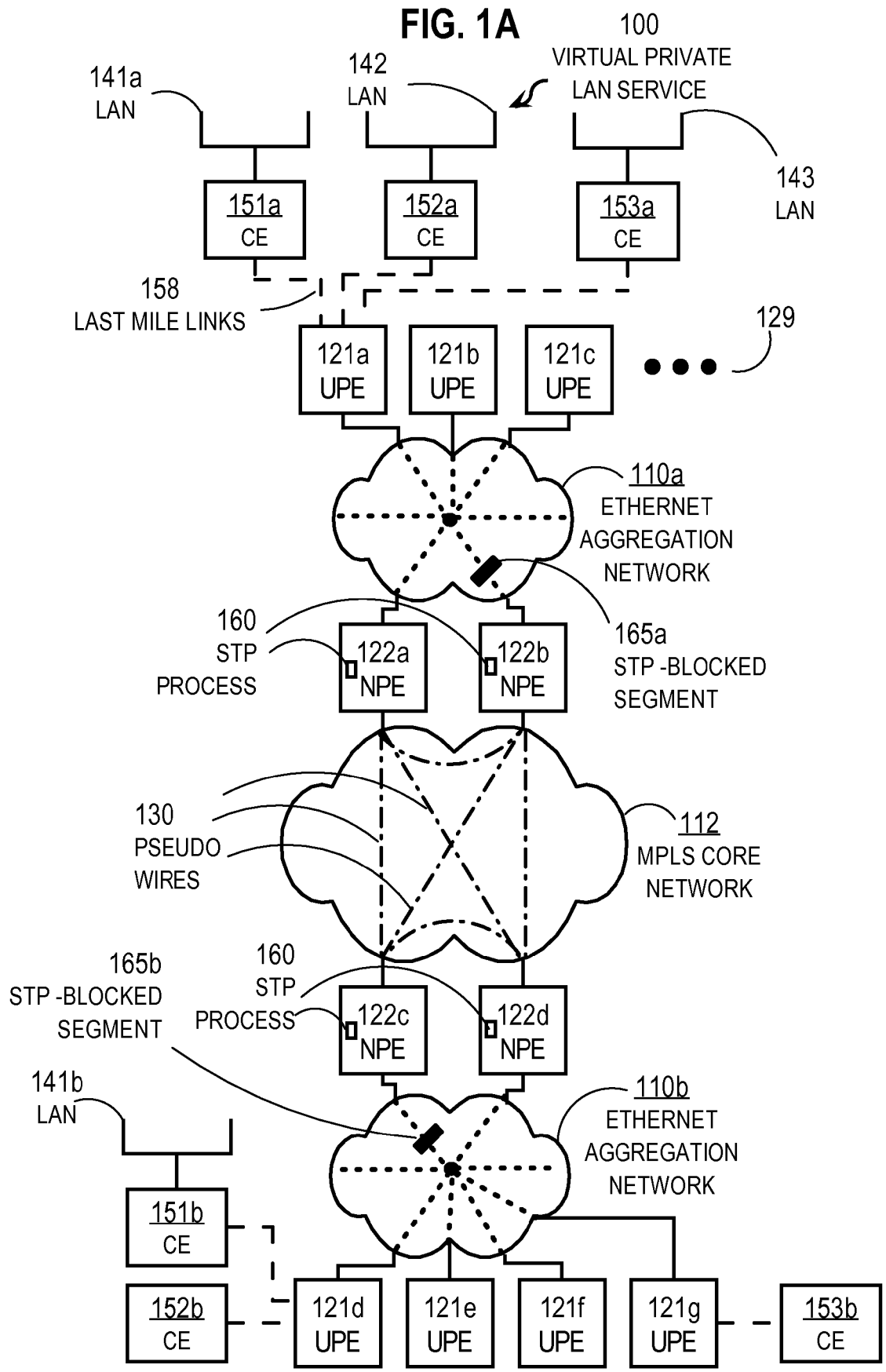

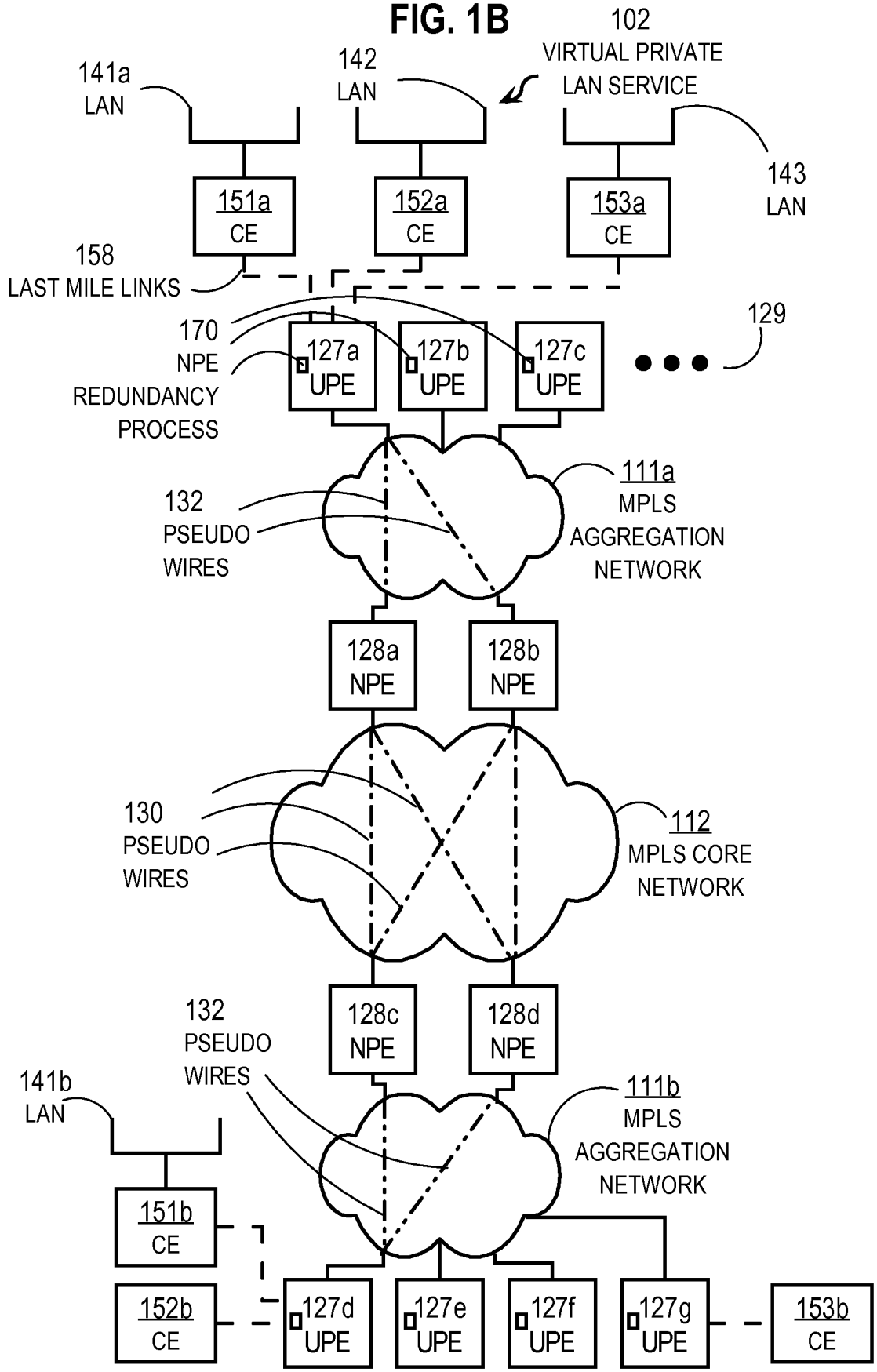

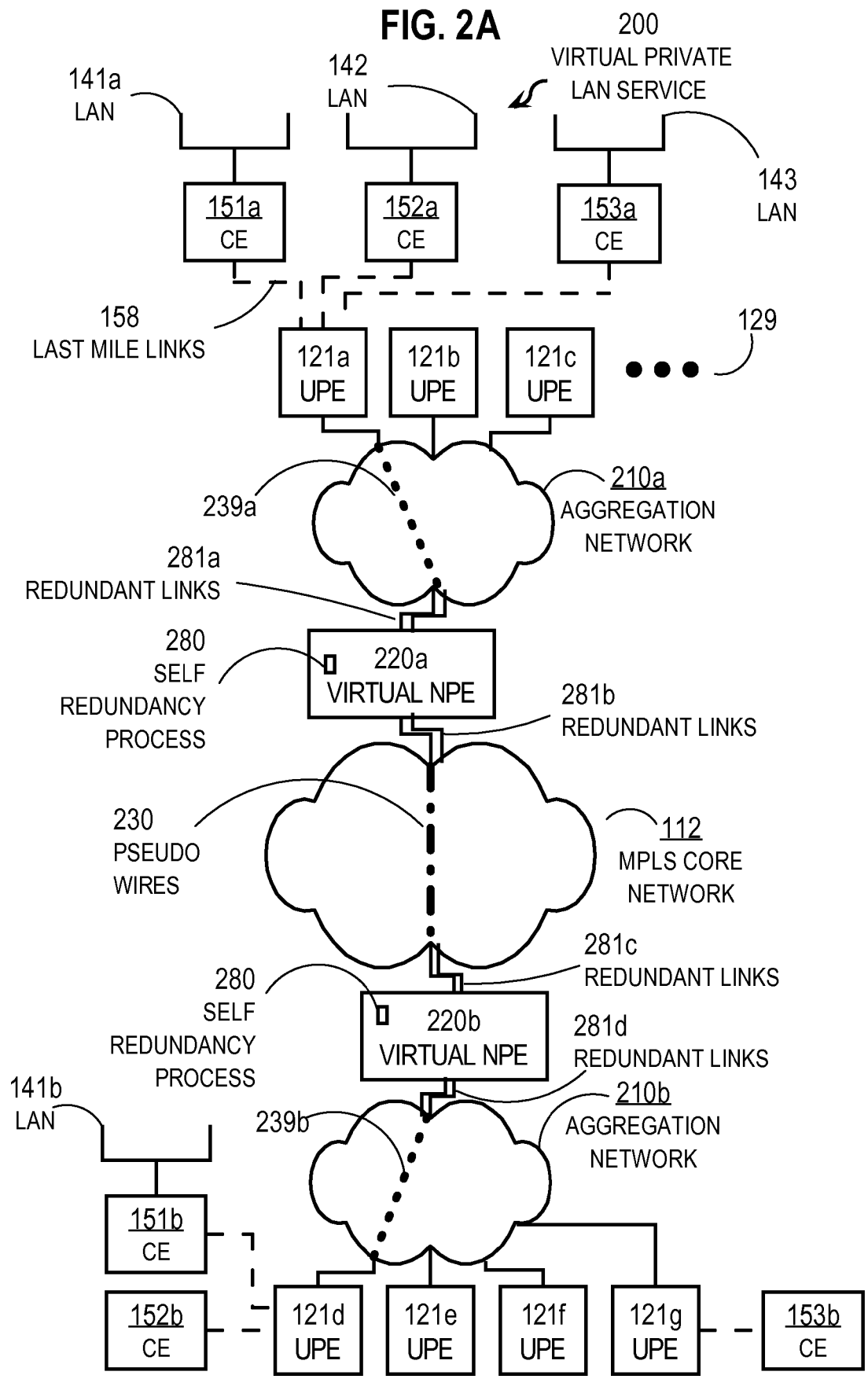

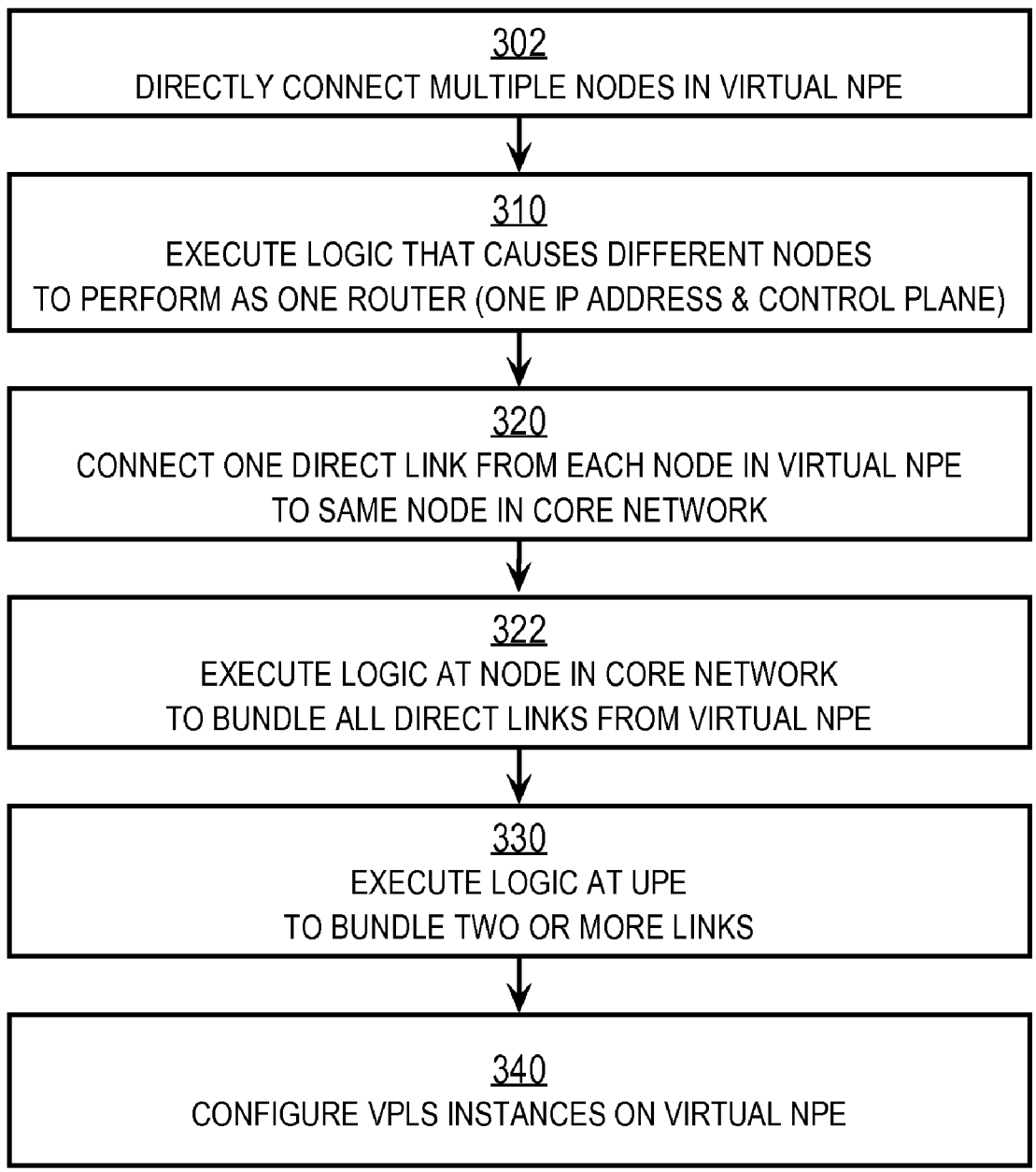

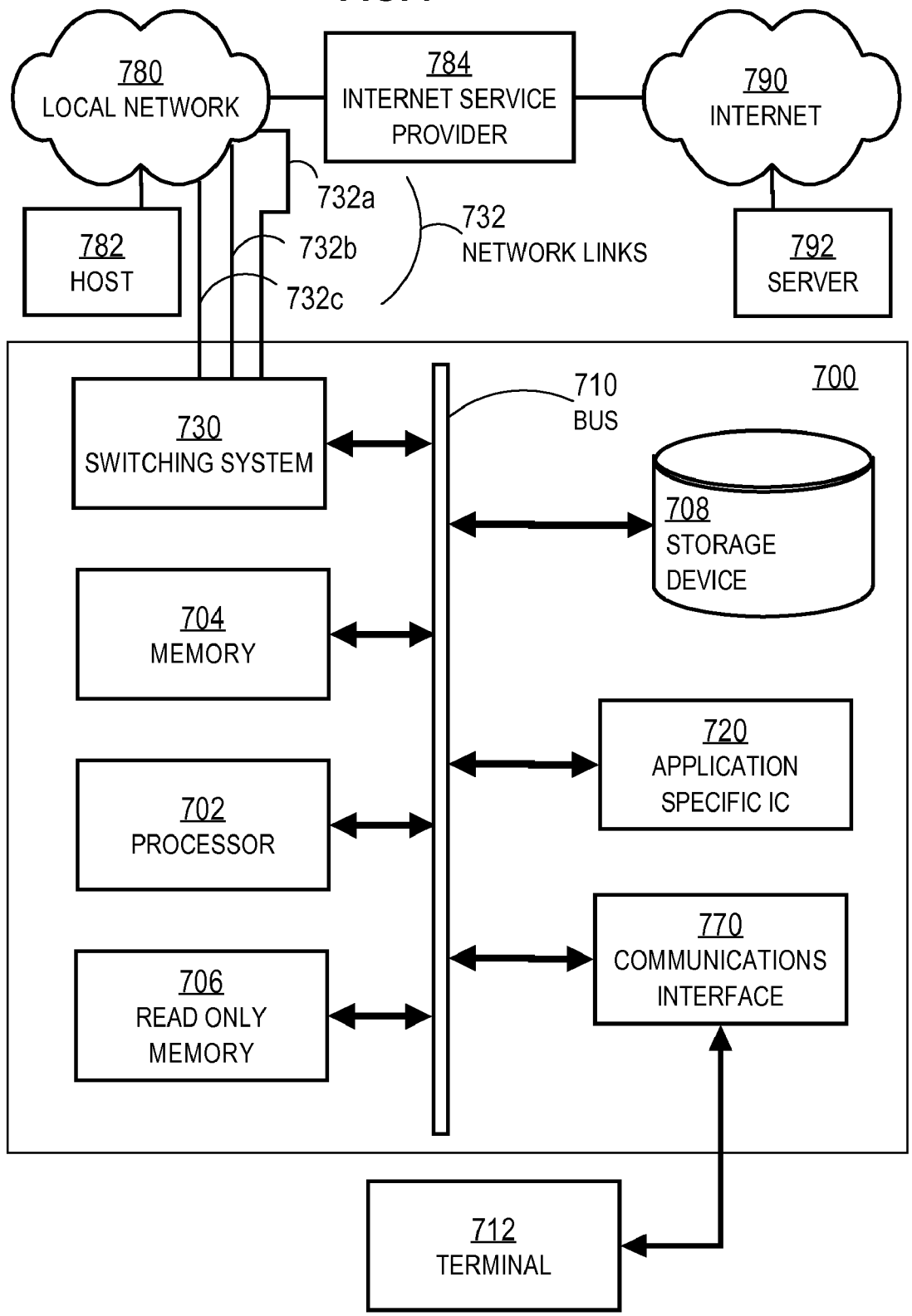

REDUNDANCY AT A VIRTUAL PROVIDER EDGE NODE THAT FACES A TUNNELING PROTOCOL CORE NETWORK FOR VIRTUAL PRIVATE LOCAL AREA NETWORK (LAN) SERVICE (VPLS)

BACKGROUND OF THE INVENTION

1. Technical Field

The present invention relates to redundancy for virtual private local area network (LAN) service (VPLS) in a communications network.

2. Background

Networks of general purpose computer systems and specialized devices connected by external communication links are well known and widely used in commerce. The networks often include one or more network devices that facilitate the passage of information between the computer systems. A network node is a network device or computer or specialized device connected by the communication links. An end node is a node that is configured to originate or terminate communications over the network. An intermediate network node facilitates the passage of data between end nodes.

A local area network (LAN) comprises multiple end nodes that share a communication link without an intervening intermediate network node. Such a communication link is called a network segment. A virtual LAN (VLAN) includes one or more intermediate network nodes called switches that forward data packets from one segment to another segment based on an identifier called a tag that indicates segments on the same VLAN.

A virtual private LAN service (VPLS) is offered by a wide area network (WAN) service provider (SP). In a VPLS, multiple LANs at remote sites for one customer are connected across a WAN, including the public Internet, as if on the same VLAN, without exposing the data packets to end nodes of different customers. To provide resilience against node failure, the SP point of presence (POP) on the WAN typically includes a pair of intermediate network nodes called network-facing provider edge nodes (NPEs).

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A illustrates a first example VPLS network;

FIG. 1B illustrates a second example VPLS network;

FIG. 2A illustrates an example VPLS network using a virtual NPE;

FIG. 3 illustrates at a high level an first example method for configuring multiple nodes as the first example virtual NPE;

FIG. 7 illustrates a computer system upon which an embodiment of the invention may be implemented.

DESCRIPTION OF EXAMPLE EMBODIMENTS

Figure 2B:
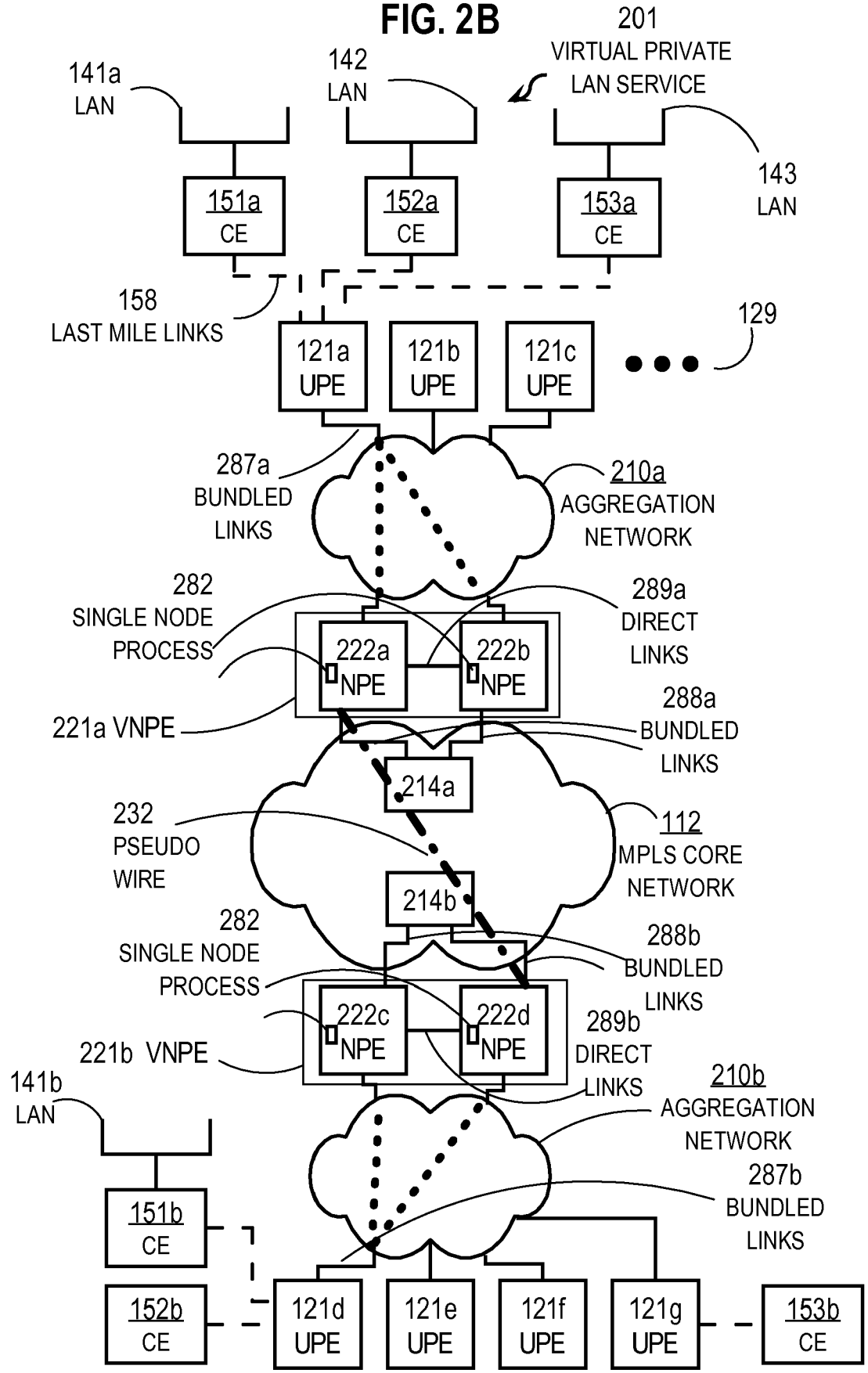
FIG. 2B illustrates an example VPLS network with a first example virtual NPE.

A method and apparatus are described for a virtual network-facing provider edge node. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described in the context of network-facing provider edge nodes between a core network using Multiple-Protocol Label Switching (MPLS) tunneling and an aggregation network using either Ethernet and Spanning Tree Protocol (STP) or MPLS. However, the invention is not limited to this context. In other embodiments, other protocols are used in the aggregation network or the core network or both.

1.0 Overview

In one set of embodiments, a method includes receiving configuration data at a particular node of a first set of multiple nodes. The configuration data includes primary data that indicates a particular zero or more instances for which the particular node is primary of multiple virtual local area network (VLAN) instances. It is determined whether a packet VLAN of a data packet received at the particular node is included in the particular instances for which the particular node is primary. If so, then the data packet is forwarded.

In another set of embodiments, a method includes connecting directly each node of a first set of multiple of nodes with every other node of the first set. Logic is executed on each node of the first set that causes the first set to perform as a single virtual node with a single network address and media access control (MAC) identifier. A first network interface on each node of the first set is connected to the same particular node in a core network that uses a tunneling protocol. A different second network interface on each node of the first set is connected to a different aggregation network that includes a second set of multiple user facing provider edge (UPE) nodes that communicates with multiple virtual local area network (VLAN) instances. Logic is executed on the single virtual node for forwarding data packets between the core network and the second set of UPE nodes for the multiple VLAN instances.

In other embodiments, an apparatus, or logic encoded in one or more tangible media, or instructions encoded on one or more computer-readable media is configured to perform one or more steps of the above method, or portions thereof.

2.0 Network Overview

Information is exchanged between network nodes according to one or more of many well known, new or still developing protocols. In this context, a "protocol" consists of a set of rules defining how the nodes interact with each other based on information sent over the communication links.

The nodes on a network segment exchange data packets formatted according to a data link layer protocol such as the Ethernet protocol. A destination or source for a data packet on a network segment is indicated by a Media Access Control (MAC) identifier that is unique among all network devices. A virtual LAN (VLAN) includes one or more intermediate network nodes (called switches) that forward data packets from one segment to another segment based on an identifier called a VLAN tag that indicates segments on the same VLAN. The tag is included in the Ethernet protocol header.

A virtual private network VPN is made up of one or more LANs or VLANs administered by one entity, called herein a customer or an instance, connected by tunnels across one or more wide area networks administered by one or more different entities, each called a service provider (SP). In network parlance, a tunnel for data is simply a protocol that encapsulates that data. A tunnel is provided by a tunneling protocol that encapsulates the data link layer protocol data packets and ensures their delivery from one site of the customer to a another site of the same customer. Different LANs and VLANs, administered by different entities and using different communication links, communicate with each other using an internetworking layer protocol, such as the Internet Protocol (IP) or the Multiple-Protocol Label Switching protocol (MPLS). The multiple customer sites can be connected by a full mesh of tunnels connecting each of the customer's LANs and VLANs to every other LAN and VLAN of the same customer. Such a mesh of tunnels is called a virtual private LAN service (VPLS).

Each tunnel is configured to indicate a particular interface at each end, and the type of data to be packed in the tunnel so that it can be correctly unpacked and delivered at the far end. The tunnel is established and disestablished using a tunneling control protocol, such as the label distribution protocol (LDP) for MPLS tunnels. The tunneling control protocol is determined during configuration. Each of the configured point to point tunnels is called a pseudowire (PW). Tunnels cross a core wide area network (WAN) from one point of presence (POP) of a service provider to another POP of the same service provider.

To provide resilience against node failure, the POP typically includes a pair of intermediate network nodes called network-facing provider edge nodes (NPEs). However, the introduction of the second NPE can cause loops in the paths that data packets take across the networks, as shown in more detail below. These loops excessively consume network resources. Different methods are employed for different NPEs to avoid loops while providing redundancy.

FIG. 1A illustrates a first example VPLS network 100 using techniques. VPLS network 100 includes a MPLS core network 112 and multiple SP Ethernet aggregation networks, including Ethernet aggregation network 110a and Ethernet aggregation network 110b collectively referenced hereinafter as Ethernet aggregation networks 110. VPLS network 100 also includes network-facing provider edge (NPE) node 122a, NPE node 122b, NPE node 122c, and NPE node 122d, collectively referenced hereinafter as NPE nodes 122, connecting one of the aggregation networks 110 to the MPLS core network 112. The VPLS network 100 also includes user-facing provider edge (UPE) node 121a, UPE node 121b, UPE node 121c, UPE node 121d, UPE node 121e, UPE node 121f, UPE node 121g, and others indicated by ellipsis 129, collectively referenced hereinafter as UPE nodes 121. The VPLS network 100 also includes customer equipment (CE) node 151a, CE node 151b, CE node 152a, CE node 152b, CE node 153a and CE node 153b, collectively referenced hereinafter as CE nodes 150. VPLS network 100 also includes LAN 141a, LAN 141b, LAN 142 and LAN 143, collectively referenced hereinafter as LANs 140.

A particular customer administers LAN 141a and LAN 141b as belonging to the same VLAN (called VLAN 1 for purposes of illustration) and acquires VPLS service from a particular service provider which administers Ethernet aggregation networks 110, along with the UPE nodes 121 and the NPE nodes 122. Each UPE node 121 is connected to one or more CE nodes over communication links 158 often referred to as the last mile and represented by dashed lines. For example, UPE node 121a is connected to CE node 151a, CE node 152a and CE node 153a. UPE node 121d is connected to CE node 151b and CE node 152b. UPE node 121g is connected to CE node 153b over last mile communication links 158. Any structure known in the art may be used for the last mile links, including coaxial cable, telephone cable optical cable and wireless links. Each LAN 140 is connected to a CE node 150. LAN 141a is connected to CE node 151a; LAN node 141b is connected to CE node 151b; LAN 142 is connected to CE node 152a and LAN 143 is connected to CE node 153a. Each LAN 140 includes one or more end nodes (not shown).

To provide an instance of VPLS for VLAN 1, the service provider receives VLAN 1 traffic from LAN 141a at UPE node 121a and must direct this traffic to UPE node 121d, which can deliver the traffic to CE node 151b and hence LAN 141b. UPE node 121a must also direct this traffic via any other aggregation network (not shown) to any other UPE node (not shown) connected to any other CE node (not shown) that is connected to a LAN (not shown) that is part of VLAN 1. Similarly, the service provider receives VLAN 1 traffic from LAN 141b at UPE node 121d and must direct this traffic to UPE node 121a, which can deliver the traffic to CE node 151a and hence LAN 141a on the same VLAN.

To connect LAN 141a to LAN 141b for VPLS, the SP maintains Ethernet aggregation networks 110 to connect all UPE nodes 121 of the SP to the MPLS core network 112. Each aggregation network 110 connects to the MPLS core network at a NPE node 122. To provide resilience in case of node or link failure, the service provider uses redundant NPE nodes 122 to connect Ethernet aggregation networks 110 to MPLS core network 112. In the illustrated example, NPE node 122a and NPE node 122b are the redundant NPE nodes for Ethernet aggregation network 110a. NPE node 122c and NPE node 122d are the redundant NPE nodes for Ethernet aggregation network 110b.

To prevent VLAN 1 traffic from being sent to NPE nodes of other service providers which have a point of presence on MPLS core network 112, the SP sets up pseudo wires (PW) 130, represented by dashed-dotted lines, between the NPE nodes involved in each VPLS instance. For purposes of illustration the PW 130 for VLAN 1 are depicted in FIG. 1A.

In the illustrated example, the VLAN traffic received by UPE node 121a is broadcast on Ethernet aggregation network 110a. A broadcast is represented by the starburst pattern of dotted lines in the Ethernet aggregation networks 110. The broadcast is normally received by all nodes in Ethernet aggregation network 110a, including both NPE node 122a and NPE node 122b. However, if both NPE node 122a and NPE node 122b were to receive and forward this traffic, a loop would form that recycles the same data packets or requires each node to perform extra processing to detect and eliminate the recycled data packets, thus consuming excess network resources. For example, a VLAN 1 packet received by both NPE node 122a and NPE node 122b would be forwarded via pseudo wires 130 to both NPE node 122c and node 122d. NPE node 122c would forward this traffic as an Ethernet broadcast over aggregation network 110b with the MAC identifier of NPE node 122c. This would be received by NPE node 122d, perceived as a broadcast by a node other than itself and forwarded via PW 130 to NPE node 122a and NPE node 122b. Each would then broadcast the same packet and perceive the other's broadcast as a different packet to be forwarded. The same packet would be forwarded back and forth across the MPLS core.

To prevent loops, the nodes in the Ethernet aggregation networks 110, including NPE nodes 122, run the spanning tree protocol (STP) well known in the art. At the time of this writing at the Spanning Tree Protocol (STP), is defined by the Institute of Electrical and Electronics Engineers, Inc (IEEE) in IEEE Standard 802.1D. As the name suggests, STP creates a spanning tree within a mesh network of connected layer-2 bridges (typically Ethernet switches), and disables the links which are not part of that tree, leaving a single active path between any two network nodes. Nodes in an Ethernet network communicate using STP to determine segments that are redundant; and blocks traffic onto those segments. For purposes of illustration the blocked segments for the redundant NPE are depicted in FIG. 1A as small solid rectangles labeled STP-blocked segment 165a and STP-blocked segment 165b, collective referenced hereinafter as STP-blocked segments 165. With the STP-blocked segment 165a enforced by STP, only NPE node 122a, of the redundant NPE node 122a and NPE node 122b, receives the broadcast VLAN 1 data packet from UPE node 121a. NPE node 122a sends the VLAN 1 data packet across MPLS core network 112 in two MPLS PWs to the redundant NPE node 122c and NPE node 122d. With the STP-blocked segment 165b enforced by STP, only NPE node 122d, of the redundant NPE node 122c and NPE node 122d, sends a broadcast of the VLAN 1 data packet in Ethernet aggregation network 110b.

Thus, to avoid loops in the illustrated example of FIG. 1A, each NPE node 122 includes an STP process 160. The redundant nodes must communicate with each other and cannot do so over the blocked segments 165, so a MPLS PW over the core network 112 is formed between the redundant nodes, as shown in FIG. 1A, to communicate control plane messages.

Although FIG. 1A depicts MPLS core network 112 connected to two aggregation networks 110 via four NPE nodes 122 for seven UPE node 121 connected to six CE nodes 150 that are connected to four LANs 140 for purposes of illustration, in other VPLS networks a core network using the same or different tunneling protocol is connected to the same or more Ethernet aggregation networks via the same or more NPE nodes for fewer, more or the same number of UPE nodes, CE nodes and LANs.

FIG. 1B illustrates a second example VPLS network 102. Like network 100 in FIG. 1A, VPLS network 102 includes a MPLS core network 112, customer equipment (CE) nodes 150 and LANs 140.

Unlike network 100, VPLS network 102 includes multiple SP MPLS aggregation networks, including MPLS aggregation network 111a and MPLS aggregation network 111b collectively referenced hereinafter as MPLS aggregation networks 111. VPLS network 102 also includes modified user-facing provider edge (UPE) node 127a, UPE node 127b, UPE node 127c, UPE node 127d, UPE node 127e, UPE node 127f, and UPE node 127g, collectively referenced hereinafter as UPE node 127, connecting each CE node 150 to an MPLS aggregation network 111. VPLS network 102 also includes modified network-facing provider edge (NPE) node 128a, NPE node 128b, NPE node 128c, and NPE node 128d, collectively referenced hereinafter as NPE node 128, connecting one of the MPLS aggregation networks 111 to the MPLS core network 112.

The MPLS aggregation networks 111 do not use Ethernet broadcasts to forward VLAN data packets (e.g., from VLAN 1 used by LAN 141a), but instead use MPLS pseudo wires 132, represented by dashed-double-dotted lines, to forward VLAN data packets. Thus STP is not available or used in MPLS aggregation network 111. Consequently, a STP process is omitted from NPE nodes 128. A pseudowire in the core network from one redundant NPE node to the other, used for control plane messages in network 100, is also omitted. To avoid loops, the UPE nodes 127 include an NPE redundancy process 170 to determine which one to use of the two pseudowires to the redundant NPE nodes 128.

In the illustrated example, the VLAN 1 traffic received by UPE node 127a is sent over only one of the pseudowires 132 based on determinations made in process 170. Because only one of the redundant NPE node 228a and NPE node 228b is used. That node sends the encapsulated VLAN 1 data packet over core 112 to both redundant NPE node 128c and NPE node 128d. Those each forward the data packet to UPE 127d over pseudowires in aggregation network 111b. UPE node 127d receives two VLAN 1 data packets but only sends one to CE node 151b by ignoring the data packet from one of the two redundant NPE node 128c and NPE node 128d based on the NPE redundancy process 170 executing in UPE node 127d.

As can be seen, the at least two different approaches to NPE redundancy require very different UPE nodes 121 and UPE nodes 127 and very different corresponding NPE nodes 122 and NPE nodes 128, respectively. For suppliers of UPE nodes and NPE nodes, this is a burden. Two different product lines have to be maintained for the two different kinds of aggregation networks in common use.

3.0 Virtual NPE Overview

According to several embodiments of the invention, the responsibility for managing redundant NPE nodes is transferred entirely to a virtual NPE node made up of the redundant NPE nodes. The virtual NPE node is the same for both Ethernet aggregation networks (e.g., aggregation networks 110) and MPLS aggregation networks (e.g., aggregation networks 111), as well as aggregation networks using different protocols. Thus a supplier of UPE nodes and NPE nodes does not have to maintain multiple separate product lines of NPE nodes, or of UPE nodes.

FIG. 2A illustrates an example VPLS network 200 using a virtual NPE (VNPE). Like network 100 in FIG. 1A, VPLS network 200 includes a MPLS core network 112, customer equipment (CE) nodes 150, LANs 140 and UPE nodes 121 that do not have to include an NPE redundancy process 170.

VPLS network 200 includes multiple SP aggregation networks, including aggregation network 210a and aggregation network 210b collectively referenced hereinafter as aggregation networks 210. Aggregation networks 210 may be use any protocol and are not required to include an independent mechanism to choose a redundant NPE node or avoid loops caused by redundant NPE nodes. Thus aggregation network 210 may be an Ethernet aggregation network like networks 110 (with or without using STP internally) or an MPLS aggregation network like networks 111, or an aggregation network using some other protocol.

VPLS network 200 includes a virtual NPE 220a and virtual NPE 220b, collectively referenced hereinafter as virtual NPE 220, connecting the core network 112 to the aggregation network 210a and aggregation network 210b, respectively. Each virtual NPE includes at least two links to the core network 112 and two links to the corresponding aggregation network 210, to provide redundancy for resilience against failed links. Each virtual NPE also includes at least two processors to provide redundancy for resilience against failed processors. Each virtual NPE includes at least one self redundancy process 280 that recovers from lost processors and links and avoids loops.

A path 239, represented by a thick dotted line, between a particular UPE and the virtual NPE 220 may be formed in any way appropriate for the protocol used in the aggregation network, such as an Ethernet broadcast, with or without STP, or a tunnel using any tunneling protocol, including MPLS.

A set of one or more pseudowires 230, represented by a thick dashed-dotted line, connect different virtual NPEs 220 across the core network 112.

The virtual NPE 220 may be configured in any manner to forward VLAN traffic across the core network 112 without loops when all links and processors are functional, and to continue forwarding VLAN traffic after the loss of one or more links or processors. Thus the virtual NPE is configured for forwarding data packets between the UPE and the core network without loops for the plurality of VLAN instances for any protocol used in the aggregation network.

FIG. 2B illustrates an example VPLS network 201 with a first example virtual NPE. Like network 200 in FIG. 2A, VPLS network 201 includes a MPLS core network 112, customer equipment (CE) nodes 150, LANs 140, UPE nodes 121 and aggregation networks 210. MPLS core network 112 includes multiple intermediate nodes, such as label switching router (LSR) 214a and LSR 214b, collectively referenced hereinafter as LSR 214.

In the embodiment illustrated in FIG. 2B, VPLS network 201 includes NPE node 222a, NPE node 222b, NPE node 222c and NPE node 222d, collectively referenced hereinafter as NPE nodes 222. The first set of redundant NPE node 222a and NPE node 222b are configured as virtual NPE (VNPE) 221a; and a second set of redundant NPE node 222c and NPE node 222d are configured as VNPE 221b. VNPE 221a and VNPE 221b are collectively referenced hereinafter as VNPE 221. In other embodiments, each VNPE includes more than two NPE nodes. The configuration of each VNPE 221 is described in more detail in a later section with reference to FIG. 3.

The NPE nodes 222 in each VNPE are connected to each other by direct links, e.g., direct link 289a and direct link 289b, collectively referenced hereinafter as intra VNPE direct links 289. Direct link 289a directly connects NPE node 222a and NPE node 222b in VNPE 221a; and direct link 289b directly connects NPE node 222c and NPE node 222d in VNPE 221b.

The single node process 282 is any process that causes two or more directly connected nodes to behave as a single virtual node in the network 201, such that each node advertises the same media access control (MAC) address and the same loop-back Internet Protocol (IP) address and responds to the same control plane routing protocol. Any traffic received by any node is handled by one of the nodes and not the other. When one link goes down, a link on the other node is used. When one processor goes down, the other processor does the work of the failed processor. For example, in some embodiments, the single node process 282 is the Virtual Switch process available from Cisco Systems, Inc. of San Jose Calif.

The multiple links from each VNPE to the core network are arranged such that at least one link from each NPE node in the VNPE connects directly to the same intermediate node, e.g., LSR, in the core network. For example, in VNPE 221a, one link form NPE node 222a connects directly to LSR 214a and one link from NPE node 222b connects directly to the same LSR 214a. Similarly, in VNPE 221b, one link form NPE node 222c connects directly to LSR 214b and one link from NPE node 222d connects directly to the same LSR 214b. The two links are bundled so that they are treated as one link at the intermediate node in the core network. The direct links from VNPE 221a to LSR 214a form bundled links 288a at LSR 214a. Similarly, the direct links from VNPE 221b to LSR 214b form bundled links 288b at LSR 214b. The links on the tunneled core network are bundled so that any tunneled VLAN data packet from the core network to the VNPE 221 is received at the VNPE. A failed link will not prevent one of the NPE nodes in the VNPE from receiving the input, because the sending LSR automatically sends all traffic over only the good links in a bundle.

The VNPE 221a forms a single pseudowire 232 to VNPE 221b to carry VLAN 1 traffic. Pseudowire 232 passes through LSR 214a and LSR 214b.

The paths through aggregation networks 210 are depicted as thick dotted lines to indicate broadcast or tunnels may be used in the aggregation networks 210. in some embodiments, the UPE nodes 121 are configured to bundle more that one link to the aggregation network or to bundle multiple logical links to the redundant NPE nodes 222. This embodiment is depicted by the bundled links 287a and bundled links 287b in aggregation network 210a and aggregation network 210b, respectively.

An additional advantage of VNPE 221 in VPLS network 201 is a reduction in the number of pseudowires traversing the core network by 75% (from 4 to 1), compared to both illustrated VPLS networks in FIG. 1A and FIG. 1B.

In the illustrated embodiment, using the Cisco Virtual Switch mechanism allows the single core node, such as LSR 214, to run IEEE 802.3ad link aggregation across the NPE nodes 222 in the VNPE 221. Only a single B-MAC address and IP address is used for the Virtual Switch process on VNPE 221. The Virtual Switch process achieves load balancing very well and gives very fast convergence time when one of its links or processors fails. With respect to the control plane messages that advertise the MAC and IP addresses reachable, only one of the multiple NPE nodes 222 is active in VNPE 221. With respect to the data plane messages, all NPE nodes 222 in VNPE 221 are allowed to forward data packets that carry the VLAN traffic, but only one forwards each VLAN data packet.

Figure 2C:
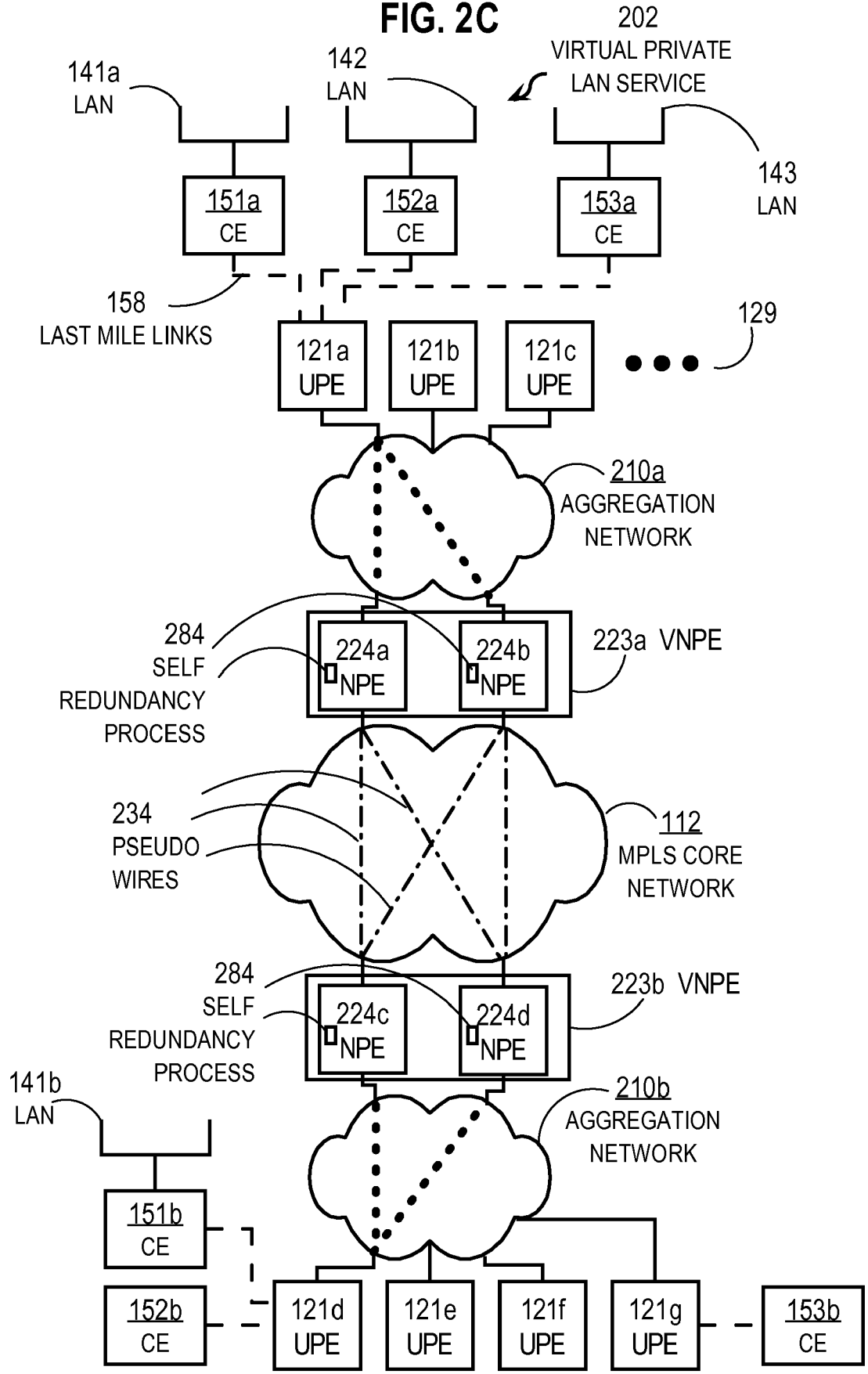
FIG. 2C illustrates an example VPLS network with a second example virtual NPE.

FIG. 2C illustrates an example VPLS network 202 with a second example virtual NPE. Like network 200 in FIG. 2A, VPLS network 201 includes a MPLS core network 112, customer equipment (CE) nodes 150, LANs 140, UPE nodes 121 and aggregation networks 210. The paths through aggregation networks 210 are depicted as thick dotted lines to indicate broadcast or tunnels may be used in the aggregation networks 210.

In the embodiment illustrated in FIG. 2C, VPLS network 201 includes NPE node 224a, NPE node 224b, NPE node 224c and NPE node 224d, collectively referenced hereinafter as NPE nodes 224. The first set of redundant NPE node 224a and NPE node 224b are configured as virtual NPE (VNPE) 223a; and a second set of redundant NPE node 224c and NPE node 224d are configured as VNPE 223b. VNPE 223a and VNPE 223b are collectively referenced hereinafter as VNPE 223. In other embodiments, each VNPE includes more than two NPE nodes. Each NPE node 224 includes links to one aggregation network 210 and to the core network 112.

Each NPE 224 in a VNPE 223 executes a self redundancy process 284. The self redundancy process 284 is described in more detail in a later section with reference to FIG. 4, FIG. 5A, FIG. 5B, and FIG. 6. The self redundancy process 284 is configured to avoid loops while providing redundant connections for forwarding VLAN traffic between the aggregation network and the core network, regardless of the protocol used in the aggregation network.

Pseudowires 234 traverse the core network 112 from each NPE node 224 in one VNPE 223 to both NPE nodes 224 in the other VNPE 223, similar in number to the pseudowires that traverse the core network 112 in VPLS network 102.

In this embodiment, only one NPE node 224 in the VNPE 223 is active to forward data packets from a particular VLAN. In order to achieve load balancing, across all NPE nodes 224 in one VNPE 223, different groups of VLAN instances are defined, with each NPE node being active for one group and backup for one or more different groups.

4.0 Virtual NPE Methods

Two particular example embodiments of the virtual NPE are described above. In this section, two methods for configuring the example embodiments of the virtual NPE to provide redundancy without loops are described in more detail.

4.1 Method for First Example Virtual NPE

Figure 6:
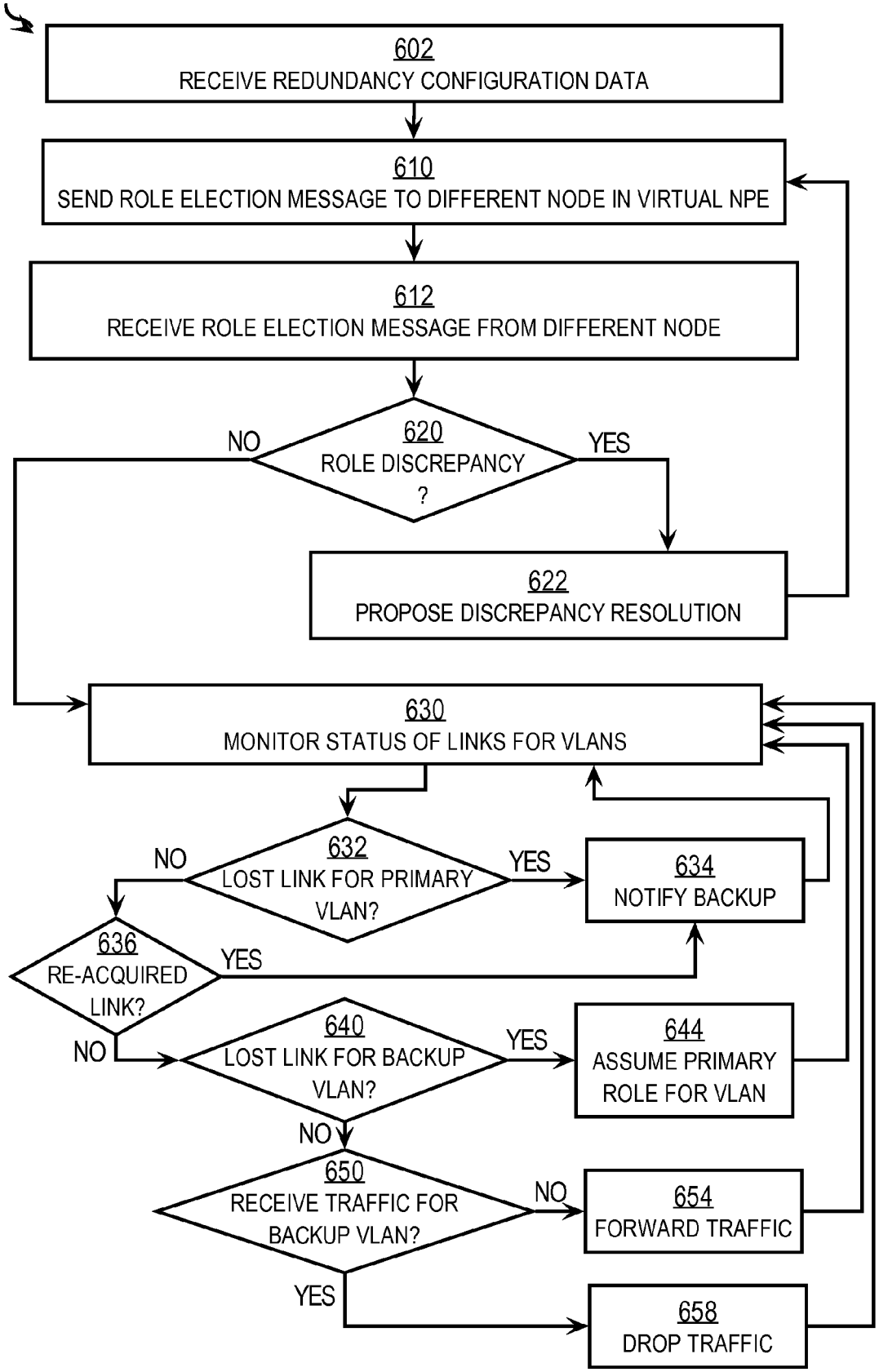
FIG. 6 illustrates at a high level an second example method for forwarding data packets at a node of the second example virtual NPE.

FIG. 3 illustrates at a high level a first example method 300 for configuring multiple nodes as the first example virtual NPE depicted in FIG. 2B. Although steps in FIG. 3 and subsequent flow diagram, FIG. 6, are shown in a particular order for purposes of illustration, in other embodiments, one or more steps may be performed in a different order or overlapping in time, in series or in parallel, or one or more steps may be omitted or added, or changed in some combination of ways.

In step 302, the multiple nodes in the virtual NPE are directly connected. For example, NPE node 222a and NPE node 222b are directly connected by direct link 289a.

In step 310, logic that causes different nodes to perform as a single node is executed. For example, the logic when executed performs the single node process 282 on each node that causes both node 222a and 222b to use the same control plane protocols to advertise and respond to the same Internet Protocol (IP) address or the same protocol to advertise and respond to the same Media Access Control (MAC) identifier, or both. A data packet arriving at either node is processed at one node but not the other, thus avoiding loops. Such logic already exists and is commercially available. In an illustrated embodiment, Virtual Switch logic from Cisco Systems is used for single node process 282.

In step 320, one interface from each node in the virtual NPE is connected directly to the same particular node in the core network. For example, each of NPE node 222a and NPE node 222b is connected by a direct link to LSR 214a in MPLS core network 112. This step allows the direct links to be bundled at the particular node in the core network in the next step. In some embodiments, one interface from each node in the virtual NPE is also connected directly to a second particular node in the core network. This protects against failure of the first particular node (e.g., LSR 214a).

In step 322, logic that bundles multiple links is executed on the particular node in the core network. For example, logic is executed on LSR 214a to create the bundled links 288a from the separate links to each NPE node 222 in virtual NPE 221a. Such logic already exists and is commercially available, for example as Link Aggregation Control Protocol (LACP). The particular node in the core network then sends all traffic to the single address of VNPE (e.g., VNPE 221a) on one of the bundled links (e.g., bundles links 288a). If one of the bundled links fails (e.g., because the link to NPE node 222a fails, or because NPE node 222a itself fails), the particular node in the core network (e.g., LSR 214a) sends traffic on the remaining good link to NPE node 222b.

In step 330, logic that bundles multiple links is executed on each UPE. For example, logic is executed on UPE node 121a to create the bundled links 287a from two separate links to aggregation network 210. For example LACP is executed on UPE node 121a. The UPE node then sends all traffic to the single network address of VNPE (or single MAC address of the VNPE in embodiments using Ethernet aggregation network) on one of the bundled links. If one of the bundled links fails, the UPE node sends traffic on the remaining good links.

In step 340, the Virtual NPE 221 is configured to forward VLAN traffic through a VPLS. For example, at the virtual switch created in each VNPE 221 by the Virtual Switch logic, each VLAN tag is associated with one pseudowire through the core network to a different VNPE 221 for each aggregation network used by the VLAN. Thus, if it is assumed for purposes of illustration that a VLAN involves three aggregation networks, then the VLAN tag is associated with two pseudowires, a first pseudowire to the first VNPE connected to a first one of the different aggregation networks, and a second pseudowire to the second VNPE connected to a second one of the different aggregation networks. It is noted that this involves 75% fewer pseudowires across the core network than the other illustrated approaches.

4.2 Method for Second Example Virtual NPE

This section describes an example method for configuring multiple nodes as the second example virtual NPE depicted in FIG. 2C. In this embodiment, the NPE nodes in a virtual NPE remain separate nodes, but exchange messages and store data to coordinate the VLAN forwarding done by each.

Figure 4:
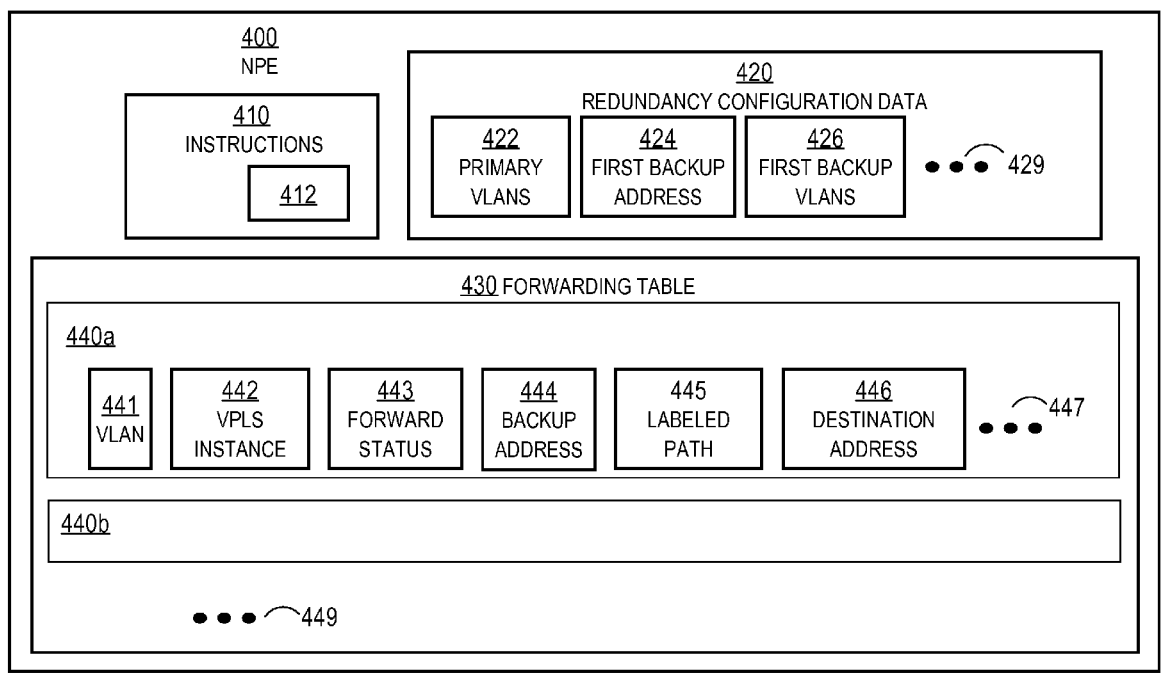
FIG. 4 illustrates example data structures on a node of the second example virtual NPE.

FIG. 4 illustrates example data structures on a node 400 of the second example virtual NPE. NPE node 400 is a particular embodiment of NPE node 224 depicted in FIG. 2C. Node 400 includes instructions data structure 410, redundancy configuration data structure 420, and a forwarding table 430.

The instructions data structure 410 holds instructions for performing the processes at node 410 and includes instructions 412 for the self redundancy process 284 that uses redundancy configuration data structure 420 and forwarding table 430. Steps performed by executing instructions 412 are described below with reference to FIG. 6.

The redundancy configuration data structure 420 includes primary VLANS field 422, first backup address field 424, first backup VLANS field 426 and zero or more additional fields indicated by ellipsis 429, for zero or more additional backup NPE nodes 224 within the virtual NPE 223.

The primary VLANS field 422 holds data that indicates zero or more VLAN instances to be forwarded by the NPE node 400, provided the NPE node 400 is operational with working links to both the aggregation network 210 and the core network 112. The NPE node 400 is a backup NPE for VLAN instances not listed in primary VLANS field 422.

The first backup address field 424 holds data that indicates the network address, such as an IP address on core network 112, of a different NPE node in the same virtual NPE. The different NPE node provides redundancy to forward the data packets for the VLAN instances indicated in field 422, should the NPE node 400, or one of its links to aggregation network 210 or core network 112, fail.

The first backup VLANS field 426 holds data that indicates zero or more VLAN instances to be forwarded by the first backup node indicated in field 424, provided the first backup node is operational with working links to both the aggregation network 210 and the core network 112. The local NPE node 400 provides redundancy to forward the data packets for the VLANS indicated in field 426, should the first backup NPE node indicated in field 424, or one of its links to aggregation network 210 or core network 112, fail.

In embodiments with multiple backups (e.g., with more than two NPE nodes in the same virtual NPE) those nodes and their VLAN instances, if any, are listed in additional fields indicated by ellipsis 429. In such embodiments, the VLAN instances associated with a node that experiences a failure (in a link or in the node itself) are distributed among the one or more remaining nodes in any manner. For example, in some embodiments, the VLAN instances associated with the node that experienced the failure are distributed evenly among the remaining nodes. As a further example, in some embodiments, the VLAN instances associated with the node that experienced the failure are all assigned to a single one of the remaining nodes. Any method may be used to select the one remaining node to take on the VLAN instances of the node that experienced the failure. In some embodiments, the selected node has the fewest VLAN instances in "Active" status, as explained below, with a tie breaking procedure, such as selecting the node with the smallest network address, among multiple nodes with the same fewest number of VLAN instances in "Active" status.

In some embodiments, all VLAN instances are assigned to one node and the backup node (or nodes) has no VLAN instances associated with it. However, by splitting the VLAN instances among all NPE nodes in a VNPE 9 such as both NPE node 224a and NPE node 224b in VNPE 223a), the forwarding load is balanced among the available NPE nodes. In the illustrated embodiment, the VLAN instances to be forwarded are distributed evenly among the available NPE nodes in each virtual NPE. In some embodiments, the VLAN instances to be forwarded are distributed unevenly among the available NPE nodes in each virtual NPE The forwarding table 430 includes, for each VLAN instance, a VLAN record, such as record 440a for a first VLAN instance and record 440b for a second VLAN instance and other records indicated by ellipsis 449 for other VLAN instances, collectively referenced hereinafter as VLAN records 440.

Each VLAN record 440 includes a VLAN field 441, a VPLS instance field 442, a forward status field 443, a backup address field 444, a labeled path field 445, a destination address field 446 and zero or more other fields indicated by ellipsis 447.

VLAN field 441 holds data that indicates a particular VLAN, such as a VLAN tag, transported over the aggregation network 210 to which NPE node 400 is directly connected. In some embodiments, forwarding table 430 includes only VLAN instances listed in field 422 or reassigned to the local NPE node 400. In some embodiments, the forwarding table 430 includes all VLAN instances listed in any field in redundancy configuration data structure 420.

The VPLS instance field 442 holds data that indicates a particular VPLS instance that is associated with a set of pseudowires through core network 112 to one or more distant virtual NPEs connected to corresponding distant aggregation networks 210. The VPLS instance is one that is associated with the VLAN indicated in field 441.

Forward status field 443 holds data that indicates whether the VPLS instance is active, failed or passive at local NPE node 400. The VPLS is active if links to both the local aggregation network 210 and the core network 210 are usable and the VLAN is listed in field 422. The VPLS is failed if links to either the local aggregation network 210 or the core network 210, or both, are not usable. The VPLS is passive if links to both the local aggregation network 210 and the core network 210 are usable, but the VLAN is listed in the configuration data structure 420 for a backup NPE node and that backup NPE node has not experienced a failure. The VPLS is also active if links to both the local aggregation network 210 and the core network 210 are usable, and the VLAN is listed in the configuration data structure 420 for a backup NPE node but that backup NPE node has experienced a failure (and the VLAN indicated in field 441 has been reassigned to the local NPE node 400 if there is more than one backup node).

Backup address field 444 holds data that indicates the address of the NPE node in the same virtual NPE, which NPE node is to be notified if the status indicated in field 443 changes from "Active" to "Failed" (or to "Passive"). The address indicated in field 444 is selected from the backup addresses in configuration data structure 420, which has not experienced a failure. If more than one backup has not experienced a failure, then the backup indicated in field 444 is one of those according to any method chosen for selecting the backup when more than one is available.

The labeled path field 445 holds data that indicates an MPLS labeled path that uniquely indicates a pseudowire in an MPLS core network 112 for the VPLS instance indicated in field 442. The destination address field 446 holds data that indicates an NPE node in a distant virtual NPE that is the terminal of the labeled path indicated in field 445. The ellipsis 437 indicates the other labeled paths and destination addresses associated with VPLS instance 442, including the labeled path and destination address of the redundant NPE nodes at the first distant VNPE, and two or more labeled paths and destination addresses for each other distant VNPE.

Although data fields in data structures at NPE node 400 are depicted as contiguous blocks of data in a particular order in a single portion of memory on node 400 for purposes of illustration, in other embodiments one or more fields or portions thereof are stored in a different order or on one or more different portions of memory on NPE node 400 or on a separate device accessible to NPE node 400 or are omitted, and one or more other fields (not shown) are included. For example, in some embodiments, each record includes a VPLS instance field 442, but the associated labeled path field 445 and destination address field 446 and other fields indicated by ellipsis 437 are stored in a separate VPLS data structure.

Figure 5A:
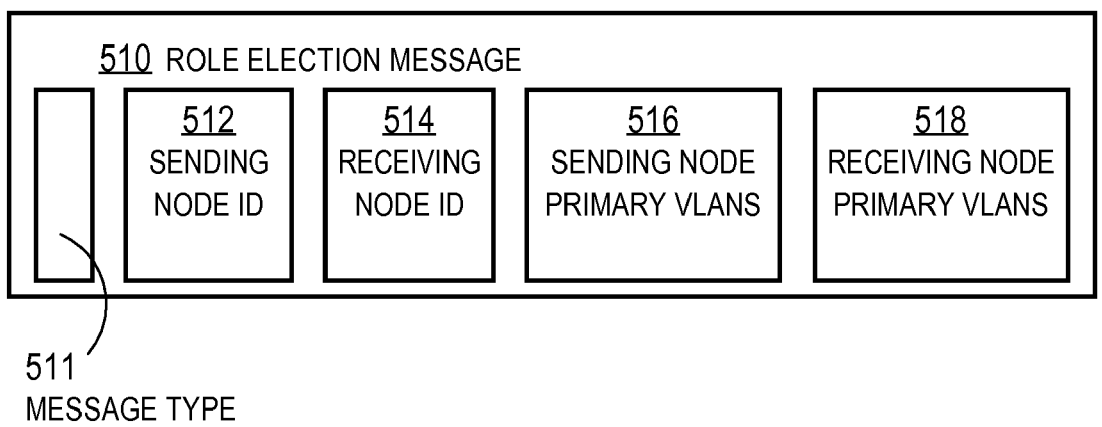
FIG. 5A illustrates an example role election message for use between nodes of the second example virtual NPE.

FIG. 5A illustrates an example role election message 510 for use between nodes of the second example NPE. Message 510 includes a message type field 511, a sending node identifier (ID) field 512, a receiving node ID field 514, a sending node primary VLANS field 516 and a receiving node primary VLANS field 518. The message 510 also includes conventional header fields for a physical layer protocol, a link layer protocol and internetwork layer protocol (not shown).

The message type 511 holds data that indicates the message is the role election message 510. Any method may be used to indicate the message type. In some embodiments, the role election message 510 is formatted as a Hot Standby Routing Protocol (HSRP) message and the message type field 511 includes a role election type field from HSRP. HSRP is described at the time of this writing in an Internet Engineering Task Force (IETF) document called Request For Comments (RFC) 2281. All IETF RFCs are available on the public Internet in World Wide Web domain ietf.org. In some embodiments, the role election message 510 is formatted as a Virtual Routing Redundancy Protocol (VRRP) message and the message type field 511 includes a role election type field from VRRP. VRRP is described at the time of this writing in IETF RFC3768.

The sending node ID field 512 holds data that indicates the NPE node that sent the message 510, such as the IP address of the sending NPE node. In some embodiments, the sending node ID field 512 is included in the internetwork layer header (not shown). Field 512 is shown just to make clear that the receiving node is aware of what node sent the message 510.

The receiving node ID field 514 holds data that indicates the NPE node that is to process the message 510, such as the IP address of the recipient NPE node. In some embodiments, the receiving node ID field 514 is included in the internetwork layer header (not shown). Field 514 is shown just to make clear that the receiving node is aware that the sending node intended to send the role election message 510 to the node that received it.

The sending node primary VLANS field 516 holds data that lists the VLANS that are primary VLANS on the sending node as configured on the sending node. This data should agree with the backup VLANS on the receiving node as indicated in the redundancy configuration data on the receiving node, when there are only two NPE nodes in the VNPE.

The sending node backup VLANS field 518 holds data that lists the VLANS that are backup VLANS on the sending node. This data should agree with the primary VLANS on the receiving node as indicated in the redundancy configuration data on the receiving node when there are only two NPE nodes in the VNPE.

In some embodiments, fields 516 and 518 are included in a role election field formatted according to HSRP/VRRP as modified for a new type of role—a VLAN primary/backup role.

Figure 5B:
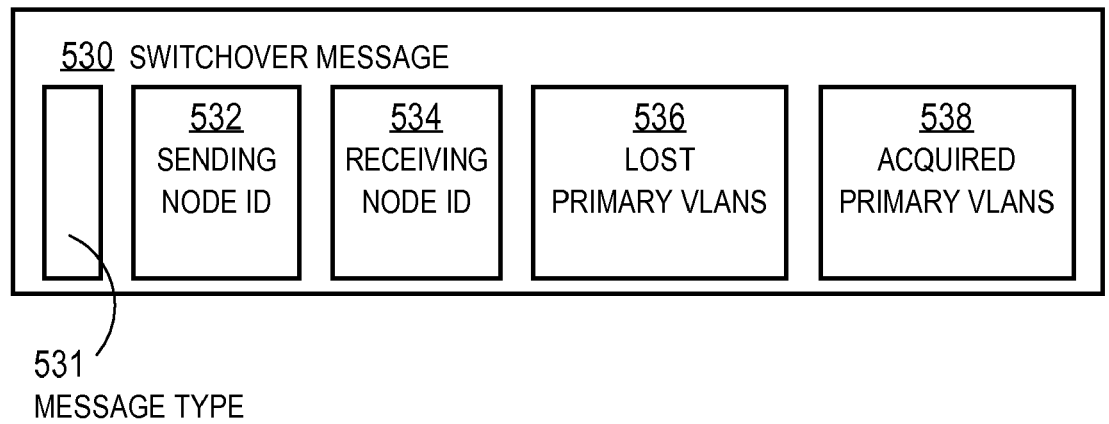
FIG. 5B illustrates an example switchover message for use between nodes of the second example virtual NPE.

FIG. 5B illustrates an example switchover message 530 for use between nodes of the second example NPE. Switchover message 530 includes message type field 531, sending node ID field 532, receiving node ID field 534, lost primary VLANS field 536 and acquired primary VLANS field 538.

The message type 531 holds data that indicates message is the switchover message 530. Any method may be used to indicate the message type. In some embodiments, the switchover message 530 is formatted as a HSRP/VRRP message and the message type field 531 includes an HSRP/VRRP failure status report message.

The sending node ID field 532 holds data that indicates the NPE node that sent the message 530, such as the IP address of the sending NPE node. In some embodiments, the sending node ID field 512 is included in the internetwork layer header (not shown). Field 532 is shown just to make clear that the receiving node is aware of what node sent the message 510.

The receiving node ID field 534 holds data that indicates the NPE node that is to process the message 530, such as the IP address of the recipient NPE node. In some embodiments, the receiving node ID field 534 is included in the internetwork layer header (not shown). Field 534 is shown just to make clear that the receiving node is aware that the sending node intended to send the switchover message 530 to the node that received it.

Lost primary VLANS field 536 holds data that indicates VLAN instances that were in the list of primary VLANS for the sending NPE node, but use links on the sending NPE node that are no longer usable.

Acquired primary VLANS field 538 holds data that indicates VLAN instances that were not in the list of primary VLANS for the sending NPE node in the configuration data, but use links on a different NPE node that are no longer usable and so the primary role has been switched to the sending NPE node.

In some embodiments, fields 536 and 538 are included in a failures status report formatted according to HSRP/VRRP as modified for a new type of status—a VLAN forwarding status.

Although data fields in message 510 and message 530 are depicted as contiguous blocks of data in a particular order for purposes of illustration, in other embodiments one or more fields or portions thereof are included in a different order or are omitted, and one or more other fields (not shown) are included.

FIG. 6 illustrates at a high level a second example method 600 for forwarding data packets at a node of the second example virtual NPE depicted in FIG. 2C.

In step 602, the local NPE node receives redundancy configuration data and stores that configuration data in a redundancy configuration data structure, e.g., data structure 420 described above. Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods.

For purposes of illustration, it is assumed that each VNPE 223 includes the two NPE nodes 224 depicted in FIG. 2C. It is further assumed that NPE node 224a has IP address 100.200.24.1 and NPE node 224b has IP address 100.200.24.2. It is further assumed that, during step 602, NPE node 224a receives configuration data that indicates primary VLAN instances VLAN 1 through VLAN 100, backup IP address 100.200.24.1 and backup VLAN instances VLAN 101 through VLAN 200. During step 602 local NPE node 224a stores that data in field 422, field 424 and field 426, respectively.

In step 610, the local NPE node sends a role election message to a different NPE node in the same VNPE. For example, NPE node 224a sends to NPE node 224b message 510 that indicates in message type field 511 it is a HSRP/VRRP role election message, that indicates its IP address 100.200.24.1 in field 512, the other node's IP address 100.200.24.2 in field 514, the VLAN instances VLAN 1 through VLAN 100 in field 516 and the VLAN instances VLAN 101 through VLAN 200 in field 518.

In step 612, the local NPE node receives a role election message from the different NPE node in the same VNPE. For example, NPE node 224a receives from NPE node 224b message 510 that indicates in message type field 511 it is a HSRP/VRRP role election message, that indicates the sending node IP address 100.200.24.2 in field 512, the local node's IP address 100.200.24.1 in field 514, the VLAN instances VLAN 101 through VLAN 200 in field 516 and the VLAN instances VLAN 1 through VLAN 100 in field 518.

In step 620, it is determined whether there is a discrepancy between the role election data from the other node and the data in the local node's configuration data. If so, control passes to step 622 to propose a resolution for the discrepancy. Any method may be used to determine a resolution for the discrepancy. Control passes from step 622 back to step 610 to send a role election message with revised data in field 516 or field 518 or both.

If it is determined, in step 620, that there is no discrepancy, then control passes to step 630. In step 630, the status of links for the VLANS forwarded by the VNPE 223 are monitored. In the illustrated embodiment, step 630 includes initially marking the forward status field 443 "Active" in all the VLAN records 440 for VLAN instances listed in the primary VLANS field 422. In some embodiments, step 630 includes initially marking the forward status field 443 "Passive" in all the VLAN records 440 for VLAN instances listed in the backup VLANS field 426. For example, the self redundancy process 284 on local NPE node 224a initially generates 200 VLAN records 440 in forwarding table 430. The VLAN forward status field 443 is updated with data that indicates "Active" and the backup address field 444 is updated with data that indicates IP address 100.200.24.2 for NPE node 224b for each VLAN record 440 in which the VLAN instance indicated by data in VLAN field 441 is from 1 through 100. The VLAN forward status field 443 is updated with data that indicates "Passive" and the backup address field 444 is updated with data that indicates IP address 100.200.24.1 for the local NPE node 224a for each VLAN record 440 in which the VLAN instance indicated by data in VLAN field 441 is from 101 through 200.

Step 630 includes monitoring the health of links to the aggregation network and the core network and listening for switchover messages or more role election messages from a different NPE node in the VNPE. For example, keep-alive messages are monitored on all links at the local NPE node 224a and switchover messages are received from the other NPE node 224b in the VNPE 223a.

In step 632 it is determined whether a local link for a primary VLAN instance is lost, e.g., by failing to receive a keep-alive message over a link to the aggregation network 210 or a link to the core network 112 or a pseudowire to a distant NPE node, or some combination. If it is determined, in step 632, that a local link for a primary VLAN instance is lost, then control passes to step 634.

In step 634, the backup NPE node is notified of the link failure in a switchover message, such as switchover message 530. Often, a lost physical link will affect all the VLAN instances for which the local NPE node was active. Step 634 includes updating the forwarding table 430. Control then passes back to step 630 to monitor status of links.

For purposes of illustration, it is assumed that the last physical link between NPE node 224a and aggregation network 210a is lost as indicated by overdue keep-alive messages. The VLAN forward status field 443 is updated with data that indicates "Passive" (or "Failed" in some embodiments) for each VLAN record 440 in which the VLAN instance indicated by data in VLAN field 441 is from 1 through 100, as indicated by the configuration data in field 422. Also during step 634, a switchover message 530 is sent from NPE node 224a to NPE node 224b. For example, NPE node 224a sends to NPE node 224b message 530 that indicates in message type field 531 it is a HSRP/VRRP failure report message, that indicates its IP address 100.200.24.1 in field 512, the other node's IP address 100.200.24.2 in field 534, the lost VLAN instances VLAN 1 through VLAN 100 in field 536 and no VLAN instances in field 538 of the modified failure report fields.

If it is determined, in step 632, that a local link for a primary VLAN instance is not lost, then control passes to step 636. In step 636, it is determined whether a link for primary VLAN instances, previously lost, has been re-acquired. If so, then control passes back to step 634 to notify the backup and take back control of the primary VLAN instances for the local NPE node. In step 634, the backup NPE node is notified of the reacquired link in a switchover message, such as switchover message 530. Often, a reacquired physical link will affect all the VLAN instances for which the local NPE node was configured to be primary. Step 634 includes updating the forwarding table 430. Control then passes back to step 630 to monitor status of links For purposes of illustration, it is assumed that a formerly lost physical link between NPE node 224a and aggregation network 210a is reacquired as indicated by a resurgence of keep-alive messages or hello/discovery messages. The VLAN forward status field 443 is updated with data that indicates "Active" for each VLAN record 440 in which the VLAN instance indicated by data in VLAN field 441 is from 1 through 100, as indicated by the configuration data in field 422. Also during step 634, a switchover message 530 is sent from NPE node 224a to NPE node 224b. For example, NPE node 224a sends to NPE node 224b message 530 that indicates in message type field 531 it is a HSRP/VRRP failure report message, that indicates its IP address 100.200.24.1 in field 512, indicates the other node's IP address 100.200.24.2 in field 534, no lost VLAN instances in field 536 and VLAN instances VLAN 1 through VLAN 100 in acquired VLANS field 538 of the modified failure report fields.

In some embodiments, control passes to step 610 instead of to step 634 when a link is reacquired, in order to start the process over by sending a role election message based on the original configuration data.

If it is determined, in step 636, that a link for primary VLAN instances, previously lost, has not been re-acquired, then control passes to step 640. In step 640, it is determined whether a link on a backup node for the backup node's primary VLAN instance is lost, e.g., by failing to receive a keep-alive message from the backup node, or by receiving from the backup node a switchover message that indicated the lost VLAN. Then control passes to step 644.

For purposes of illustration, it is assumed that the last link between NPE node 224b and core network 112 is lost as indicated at the backup node by overdue keep-alive messages. The backup NPE node 224b sends a switchover message 530 to local NPE node 224a. For example, NPE node 224b sends to NPE node 224a message 530 that indicates in message type field 531 it is a HSRP/VRRP failure report message, that indicates the backup NPE node's IP address 100.200.24.b in field 512, indicates the local NPE node's IP address 100.200.24.1 in field 534, the lost VLAN instances VLAN 101 through VLAN 200 in field 536 and no VLAN instances in field 538 of the modified failure report fields. When the switchover message is received at the local NPE node 224a, it is determined that there is a lost link for the backup VLAN instances 101 through 200. Control passes to step 644.

In step 644, the local NPE node assumes the active role for the backup VLAN instances. Step 444 includes updating the forwarding table 430. Control then passes back to step 630 to monitor status of links.

For example, when the local NPE node 224a receives the switchover message from the backup NPE node 224b, the local NPE node assumes the primary role for the VLAN instances VLAN 101 through VLAN 200. The VLAN forward status field 443 is updated with data that indicates "Active" for each VLAN record 440 in which the VLAN instance indicated by data in VLAN field 441 is from 101 through 200, as indicated by the data in the lost primary VLANS field 536 in the switchover message 530 received from the backup NPE node 224b. Control then passes back to step 630 to monitor status of links.

If it is determined, in step 640, that a link on a backup node for the backup node's primary VLAN instance is not lost, then control passes to step 650. In step 650, it is determined whether the local NPE node receives a data packet for a backup VLAN, e.g., traffic for a VLAN for which the associated forward status field 443 currently holds data that indicates "Passive." The associated forward status field 443 is in the VLAN record 440 where the data in the VLAN field 441 indicates the VLAN instance of the data packet received.

If it is determined, in step 650, that the local NPE node did not receive a data packet for a backup VLAN, then control passes to step 654 to forward the traffic. Control passes back to step 630 to monitor the status of links.

It is assumed for purposes of illustration that the forwarding table 430 indicates active and passive forwarding status at the local NPE node 224a as originally configured, e.g., "Active" for VLAN instances 1 through 100 and passive for VLAN instances 101 through 200. It is further assumed that local NPE node 220a receives a data packet for VLAN instance 1. Then, during step 650, it is determined that the local NPE node 224a received a data packet for a VLAN with forward status of "Active," and therefore did not receive VLAN traffic for a backup VLAN; and control passes to step 654 to forward the traffic.

If it is determined, in step 650, that the local NPE node did receive a data packet for a backup VLAN, then control passes to step 658 to drop the traffic. Control passes back to step 630 to monitor the status of links.

It is assumed for purposes of illustration that local NPE node 220a receives a data packet for VLAN instance 111. Then, during step 650, it is determined that the local NPE node 224a received a data packet for a VLAN with forward status of "Passive," and therefore did receive VLAN traffic for a backup VLAN; and control passes to step 658 to drop the traffic.

Thus only one NPE node in a VNPE will be active for a particular VLAN; and loops for that VLAN are avoided. When there is failure on the active node for a VLAN, then the backup node becomes active and forwards the VLAN traffic, thus providing resilience against failure through redundancy.

4.0 Implementation Mechanisms—Hardware Overview

FIG. 7 illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made variations in amplitude, frequency, phase, polarization or other physical properties of carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 710 for use by the processor from an external terminal 712, such as a terminal with a keyboard containing alphanumeric keys operated by a human user, or a sensor. A sensor detects conditions in its vicinity and transforms those detections into signals compatible with the signals used to represent information in computer system 700. Other external components of terminal 712 coupled to bus 710, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 712. In some embodiments, terminal 712 is omitted.

Computer system 700 also includes one or more instances of a communications interface 770 coupled to bus 710. Communication interface 770 provides a two-way communication coupling via transmission media to a variety of external devices that operate with their own processors, such as printers, scanners, external disks, and terminal 712. Firmware or software running in the computer system 700 provides a terminal interface or character-based command interface so that external commands can be given to the computer system. For example, communication interface 770 may be a parallel port or a serial port such as an RS-232 or RS-422 interface, or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented using carrier waves. For wireless links, the communications interface 770 sends and receives electrical, acoustic or electromagnetic signals, including infrared and optical signals, which carry information streams, such as digital data.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 700 includes switching system 730 as special purpose hardware for switching information for flow over a network. Switching system 730 typically includes multiple communications interfaces, such as communications interface 770, for coupling to multiple other devices. In general, each coupling is with a network link 732 that is connected to another device in or attached to a network, such as local network 780 in the illustrated embodiment, to which a variety of external devices with their own processors are connected. In some embodiments, an input interface or an output interface or both are linked to each of one or more external network elements. Although three network links 732*a*, 732*b*, 732*c* are included in network links 732 in the illustrated embodiment, in other embodiments, more or fewer links are connected to switching system 730. Network links 732 typically provides information communication via transmission media through one or more networks to other devices that use or process the information. For example, network link 732*b* may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides routing information for use with switching system 730.

The switching system 730 includes logic and circuitry configured to perform switching functions associated with passing information among elements of network 780, including passing information received along one network link, e.g. 732*a*, as output on the same or different network link, e.g., 732*c*. The switching system 730 switches information traffic arriving on an input interface to an output interface according to pre-determined protocols and conventions that are well known. In some embodiments, switching system 730 includes its own processor and memory to perform some of the switching functions in software. In some embodiments, switching system 730 relies on processor 702, memory 704, ROM 706, storage 708, or some combination, to perform one or more switching functions in software. For example, switching system 730, in cooperation with processor 704 implementing a particular protocol, can determine a destination of a packet of data arriving on input interface on link 732*a* and send it to the correct destination using output interface on link 732*c*. The destinations may include host 782, server 792, other terminal devices connected to local network 780 or Internet 790, or other routing and switching devices in local network 780 or Internet 790.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720 and circuits in switching system 730, may be used in place of or in combination with software to implement the invention. Thus, embodiments of the invention are not limited to any specific combination of hardware and software, unless otherwise explicitly stated.

The signals transmitted over network link 732 and other networks via transmission media through communications interfaces such as interface 770, carry information to and from computer system 700. Computer system 700 can send and receive information, including program code, through the networks 780, 790 among others, through network links 732 and communications interfaces such as interface 770. In an example using the Internet 790, a server 792 transmits program code for a particular application, requested by a message sent from computer 700, through Internet 790, ISP equipment 784, local network 780 and network link 732*b* through communications interface in switching system 730. The received code may be executed by processor 702 or switching system 730 as it is received, or may be stored in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 732*b*. An infrared detector serving as communications interface in switching system 730 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702 or switching system 730.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:

receiving configuration data at a particular node of a virtual edge node, the first virtual edge node including a plurality of network facing provider edge (NPE) nodes each connected both to a core network that uses a tunneling protocol and an aggregation network, the configuration data including data identifying that the particular node is a primary node, of the plurality of NPE nodes, for one or more particular virtual local area network (VLAN) instances in a plurality of VLAN instances, wherein the aggregation network includes a second virtual edge node including a plurality of user facing provider edge (UPE) nodes that communicate with the plurality of VLAN instances, identifying, in a data packet received at the particular node, an indication that the first data packet corresponds to a first VLAN;

determining that the VLAN is included in the one or more particular VLAN instances for which the particular node is the primary node; and forwarding the data packet based at least in part on the determination that the first VLAN is included in the one or more particular VLAN.

2. A method as recited in claim 1, wherein the one or more particular VLAN instances are fewer than all the plurality of VLAN instances, whereby a VLAN forwarding load is distributed among the plurality of NPE nodes.

3. A method as recited in claim 1, wherein:

receiving configuration data includes receiving configuration data that includes backup node data that identifies one or more other nodes of the plurality of NPE nodes; and the method further comprises:

identifying, in a second data packet received at the particular node, an indication that the second data packet corresponds to a data transmission over a second VLAN; and determining that the second VLAN is not included in the one or more particular VLAN instances.

4. A method as recited in claim 3, further comprising determining that the one or more other nodes is not active for forwarding the second data packet of the second VLAN;

forwarding the second data packet using the particular node to provide resilience against packet delivery failure.

5. A method as recited in claim 3, further comprising, exchanging messages between one or more of the plurality of NPE nodes to determine, for each of the plurality of VLAN instances, which of the plurality of NPE nodes is a primary node of the respective VLAN instance, wherein at least one of the one or more other nodes is a primary node of at least one other VLAN instance in the plurality of VLAN instances and a VLAN forwarding load is balanced among the particular node and the different one or more other nodes of the plurality of NPE nodes based at least in part on the exchanging of messages.

6. A method as recited in claim 1, wherein each of the one or more particular VLAN instances is associated with a virtual private LAN service (VPLS) and an associated tunnel across the core network, which terminates at the particular node.

7. A method as recited in claim 1, wherein the virtual edge node is operable for use in any one of a plurality of different aggregation networks, the plurality of aggregation networks including a aggregation network using a protocol and a second aggregation network using a second protocol different from the protocol.

8. A method as recited in claim 1, wherein the protocol used in the aggregation network is a spanning tree protocol (STP) that blocks traffic on redundant network segments between intermediate network nodes; and, the plurality of NPE nodes does not process STP control packets.

9. A method as recited in claim 7, wherein the protocol is Multiple-Protocol Label Switching without a spanning tree protocol (STP) that blocks traffic on redundant network segments between intermediate network nodes and the second protocol is a spanning tree protocol (STP) that blocks traffic on redundant network segments between intermediate network nodes.

10. A method comprising:

connecting directly each node of a plurality of nodes with every other node of the first plurality of nodes;

executing logic on each node of the plurality of nodes that causes the plurality of nodes to perform as a single virtual node with a single network address and media access control (MAC) identifier;

connecting a network interface on each node of the plurality of nodes to the same particular node in a core network that uses a tunneling protocol; and connecting a different second network interface on each node of the plurality of nodes to a different aggregation network that includes a second plurality of user facing provider edge (UPE) nodes that communicates with a plurality of virtual local area network (VLAN) instance; and executing logic on the single virtual node for forwarding data packets between the core network and the second plurality of UPE nodes for the plurality of VLAN instances.

11. A method as recited in claim 10, further comprising executing logic for a link aggregation control protocol (LACP) on the particular node in the core network to cause the particular node to bundle all direct connections from the particular node to the first network interface on each node of the plurality of nodes.

12. A method as recited in claim 10, further comprising associating with VLAN instance of the plurality of VLAN instances with a different instance of a virtual private LAN service (VPLS) and an associated set of one or more tunnels across the core network, which tunnels terminate at the single virtual node.

13. A method as recited in claim 10, further comprising executing logic for a link aggregation control protocol (LACP) on each UPE in the aggregation network to bundle links from the UPE to the single virtual node.

14. A method as recited in claim 10, wherein any protocol is used in the aggregation network.

15. A method as recited in claim 14, wherein: the protocol used in the aggregation network is a spanning tree protocol (STP) that blocks traffic on redundant network segments between intermediate network nodes; and, the single virtual node does not process STP control packets.

16. A method as recited in claim 14, wherein the protocol used in the aggregation network is Multiple-Protocol Label Switching without a spanning tree protocol (STP) that blocks traffic on redundant network segments between intermediate network nodes.

17. An apparatus comprising:

a plurality of network interfaces that are each configured for communicating a data packet with a packet-switched network;

logic encoded in one or more tangible media for execution, and, when executed, cause one or more processors to:
  receive configuration data including primary node data identifying that the apparatus is a primary node for one or more particular virtual local area network (VLAN) instances;
  identify an indication that a first data packet, received at a network interface of the plurality of network interfaces, corresponds to a VLAN instance;
  determine that the VLAN instance is included in the one or more particular VLAN instances for which the apparatus is the primary node; and
  forward the first data packet based at least in part on a determination that the first VLAN instance is included in the one or more particular VLAN instances; and
wherein the apparatus is included in a plurality of edge nodes of a virtual edge node, a fist plurality of the plurality of network interfaces are each configured for communicating a data packet with a core network that uses a tunneling protocol, and a second plurality of the plurality of network interfaces are each configured for communicating a data packet with an aggregation network that includes a plurality of user facing provider edge (UPE) nodes that communicate with the plurality of VLAN instances.

18. An apparatus as recited in claim 17, wherein the one or more particular VLAN instances are fewer than all the plurality of VLAN instances, whereby a VLAN forwarding load is distributed among a plurality of nodes.

19. An apparatus as recited in claim 17, wherein:
  receiving configuration data includes receiving configuration data that includes backup node data that identifies one or more other nodes of the first plurality of nodes; and
  the logic, when executed, further cause one or more processors to:
    identify, in a second data packet received at a network interface of the plurality of network interfaces, an indication that the second data packet corresponds to a second VLAN instance; and
    determine that the second VLAN instance is not included in the particular one or more VLAN instances for which the apparatus is the primary node.

20. An apparatus as recited in claim 19, wherein the logic, when executed, further cause one or more processors to:
  determine that the one or more other nodes is not active for forwarding the second data packet of the second VLAN instance; and
  forward the second data packet to provide resilience against packet delivery failure.

21. An apparatus as recited in claim 17, wherein the virtual edge node is operable for use in any one of a plurality of different aggregation networks, the plurality of aggregation networks including a aggregation network using a protocol and a second aggregation network using a second protocol different from the protocol.

22. An apparatus comprising:
  a plurality of network interfaces that are each configured for communicating a data packet with an aggregation packet-switched network that includes a plurality of user facing provider edge (UPE) nodes that communicates with a plurality of virtual local area network (VLAN) instances;
  a second plurality of network interfaces that are each configured for communicating a data packet with a particular node in a core packet-switched network that uses a tunneling protocol for forwarding data packets for the plurality of VLAN instances;
  a plurality of processors, wherein each one of the plurality of processors is connected to a network interface of the plurality of network interfaces and a network interface of the second plurality of network interfaces and to every other processor in the plurality of processors; and
  logic encoded in one or more tangible media for execution on the plurality of processors, and, when executed, operable for
    causing the plurality of processors to perform as a single virtual node with a single network address and media access control (MAC) identifier, and
    forwarding data packets between the core network and the second plurality of user facing provider edge (UPE) nodes for the plurality of VLAN instances.

23. A method as recited in claim 3, further comprising determining that at least one of the one or more other nodes is active for forwarding the second data packet of the second VLAN, wherein the second data packet is not forwarded by the particular node based at least in part on the determination that at least one of the one or more other nodes is active for forwarding the second data packet of the second VLAN and not forwarding the second packet, using the particular node, assists in avoidance of network loops.

24. An apparatus as recited in claim 19, wherein the logic, when executed, further cause one or more processors to determine that at least one of the one or more other nodes is active for forwarding the second data packet of the second VLAN, wherein the second data packet is not forwarded by the apparatus based at least in part on a determination that at least one of the one or more other nodes is active for forwarding the second data packet of the second VLAN and not forwarding the second packet, using the apparatus, assists in avoidance of network loops.

* * * * *